US011746501B1

(12) United States Patent
Gajić et al.

(10) Patent No.: US 11,746,501 B1
(45) Date of Patent: Sep. 5, 2023

(54) AUTONOMOUS CONTROL OF OPERATIONS OF POWERED EARTH-MOVING VEHICLES USING DATA FROM ON-VEHICLE PERCEPTION SYSTEMS

(71) Applicant: AIM Intelligent Machines, Inc., Monroe, WA (US)

(72) Inventors: Andrija Gajić, Krusevac (RS); Adam Sadilek, Monroe, WA (US)

(73) Assignee: RIM Intelligent Machines, Inc., Monroe, WA (US)

( * ) Notice: Subject to any disclaimer, the term of this patent is extended or adjusted under 35 U.S.C. 154(b) by 0 days.

(21) Appl. No.: 18/100,492

(22) Filed: Jan. 23, 2023

Related U.S. Application Data

(60) Provisional application No. 63/401,928, filed on Aug. 29, 2022.

(51) Int. Cl.
*E02F 9/20* (2006.01)
*E02F 9/26* (2006.01)
(Continued)

(52) U.S. Cl.
CPC .............. *E02F 9/205* (2013.01); *E02F 9/262* (2013.01); *E02F 9/265* (2013.01); *G05D 1/027* (2013.01);
(Continued)

(58) Field of Classification Search
CPC ........... E02F 9/205; E02F 9/262; E02F 9/265; G05D 1/0238; G05D 1/027; G05D 1/0278;
(Continued)

(56) References Cited

U.S. PATENT DOCUMENTS 11,346,086 B1 * 5/2022 Kikani ................. E02F 9/2041
11,375,041 B2 6/2022 Theverapperuma et al.
(Continued)

FOREIGN PATENT DOCUMENTS

CN 115205395 A 10/2022
EP 4083335 A2 8/2022
(Continued)

OTHER PUBLICATIONS

Grove—12 Bit Magnetic Rotary Position Sensor (AS5600), retrieved on Aug. 22, 2022 from wiki.seeedstudio.com/Grove-12-bit-Magnetic-Rotary-Position-Sensor-AS5600/, 13 pages.
(Continued)

*Primary Examiner* — Russell Frejd
(74) *Attorney, Agent, or Firm* — VLP Law Group LLP; James A. D. White

(57) ABSTRACT

Systems and techniques are described for implementing autonomous control of earth-moving construction and/or mining vehicles, including to automatically determine and control autonomous movement (e.g., of a vehicle's hydraulic arm(s), tool attachment(s), tracks/wheels, rotatable chassis, etc.) to move materials or perform other actions based at least in part on data about an environment around the vehicle(s). A perception system on a vehicle that includes at least a LiDAR component may be used to repeatedly map a surrounding environment and determine a 3D point cloud with 3D data points reflecting the surrounding ground and nearby objects, with the LiDAR component mounted on a component part of the vehicle that is moved independently of the vehicle chassis to gather additional data about the environment. GPS data from receivers on the vehicle may further be used to calculate absolute locations of the 3D data points.

25 Claims, 20 Drawing Sheets

(51) Int. Cl.
  *G05D 1/02* (2020.01)
  *G06T 17/05* (2011.01)
  *G06V 10/764* (2022.01)
  *G06V 20/58* (2022.01)
  *G06T 7/70* (2017.01)
  *G06T 7/521* (2017.01)
  *G06V 20/64* (2022.01)

(52) U.S. Cl.
  CPC ......... *G05D 1/0238* (2013.01); *G05D 1/0278* (2013.01); *G06T 7/521* (2017.01); *G06T 7/70* (2017.01); *G06T 17/05* (2013.01); *G06V 10/764* (2022.01); *G06V 20/58* (2022.01); *G06V 20/64* (2022.01); *G05D 2201/0202* (2013.01); *G06T 2200/04* (2013.01); *G06T 2207/10028* (2013.01); *G06T 2207/30261* (2013.01); *G06T 2210/56* (2013.01)

(58) Field of Classification Search
  CPC ........... G06T 7/521; G06T 7/70; G06T 17/05; G06T 2200/04; G06T 2207/10028; G06T 2207/30261; G06T 2210/56; G06V 10/764; G06V 20/58; G06V 20/64
  See application file for complete search history.

(56) References Cited

U.S. PATENT DOCUMENTS

| | | | |
|---|---|---|---|
| 11,560,690 | B2 | 1/2023 | Halder et al. |
| 11,567,197 | B2 | 1/2023 | Halder |
| 2018/0245308 | A1* | 8/2018 | Ready-Campbell ........... E02F 9/2029 |
| 2020/0032483 | A1* | 1/2020 | Ready-Campbell ........... G05D 1/0274 |
| 2020/0063395 | A1* | 2/2020 | Ready-Campbell ........... G05D 1/0088 |
| 2020/0111169 | A1 | 4/2020 | Halder et al. |
| 2020/0150650 | A1 | 5/2020 | Jarlengrip |
| 2020/0150687 | A1 | 5/2020 | Halder et al. |
| 2020/0310442 | A1 | 10/2020 | Halder et al. |
| 2020/0394813 | A1* | 12/2020 | Theverapperuma ........... G06F 18/2431 |
| 2021/0017738 | A1 | 1/2021 | Sano |
| 2021/0254308 | A1 | 8/2021 | Thibblin et al. |
| 2021/0317633 | A1 | 10/2021 | Sherlock |
| 2022/0024485 | A1 | 1/2022 | Theverapperuma et al. |
| 2022/0025612 | A1* | 1/2022 | Zhang ................ E02F 9/262 |
| 2022/0026921 | A1 | 1/2022 | Halder |
| 2022/0042286 | A1 | 2/2022 | Tsuji et al. |
| 2022/0057513 | A1 | 2/2022 | Pihl |
| 2022/0154431 | A1 | 5/2022 | Kurosawa |
| 2022/0282451 | A1* | 9/2022 | Ready-Campbell ........... G05D 1/0214 |
| 2022/0340171 | A1 | 10/2022 | Halder |
| 2022/0412057 | A1* | 12/2022 | Kikani ................ E02F 9/262 |
| 2023/0031524 | A1* | 2/2023 | Ready-Campbell ........... G05D 1/0274 |

FOREIGN PATENT DOCUMENTS

| | | |
|---|---|---|
| KR | 10-2022-0014477 | 12/2022 |
| WO | 2018099755 A1 | 6/2018 |
| WO | 2022198331 A1 | 9/2022 |

OTHER PUBLICATIONS

ZED-F9P-04B u-blox F9 high precision GNSS module, May 3, 2022, retrieved on Aug. 22, 2022 from www.u-blox.com/sites/default/files/ZED-F9P-04B_Datasheet_UBX-21044850.pdf, 25 pages.
Digi XBee SX 868 Datasheet, retrieved on Aug. 22, 2022 from www.digi.com/resources/library/data-sheets/ds_xbee-sx-868, 2 pages.
ST LM217/LM317 Datasheet, Dec. 2021, retrieved on Aug. 22, 2022 from www.st.com/resource/en/datasheet/m317.pdf, 34 pages.
ST LD1117 Datasheet, Feb. 2020, retrieved on Aug. 22, 2022 from www.st.com/resource/en/datasheet/ld1117.pdf, 46 pages.
Texas Instruments TCAN33x 3.3-V Can Transceivers With CAN FD, Dec. 2019, retrieved on Aug. 22, 2022 from www.ti.com/lit/gpn/TCAN334, 45 pages.
PJRC Teensy 4.1 Development Board, retrieved on Mar. 18, 2022 from www.pjrc.com/store/teensy41.html, 22 pages.
Fairchild Semiconductor ONSEMI N-Channel Logic Level Enhancement Mode Field Effect Transistor BSS138, Nov. 2021, retrieved on Aug. 22, 2022 from www.onsemi.com/pdf/datasheet/bss138-d.pdf, 7 pages.
NXP Semiconductors i.MX RT1060 Crossover MCU with Arm® Cortex®-M7 Core, retrieved on Aug. 22, 2022 from https://www.nxp.com/products/processors-and-microcontrollers/arm-microcontrollers/i-mx-rt-crossover-mcus/i-mx-rt1060-crossover-mcu-with-arm-cortex-m7-core:i.MX-RT1060, 9 pages.
LIVOX LVX Specifications v1.1.0.0, 2019, retrieved on Aug. 22, 2022 from www.livoxtech.com/3296f540ecf5458a8829e01cf429798e/downloads/Livox Viewer/LVX Specifications EN_20190924.pdf, 12 pages.
Inductive Proximity Sensor LJ12A3-4-Z/BX, retrieved on Aug. 22, 2022 from datasheetspdf.com/pdf-file/1096182/ETT/LJ12A3-4-Z/1, 1 page.
Brianna Wessling, "Teleo announces $12M in Series A funding", Jun. 13, 2022, retrieved on Jun. 20, 2022 from www.therobotreport.com/teleo-announces-12m-in-series-a-funding/, 10 pages.
Frank Tobe, "Blue River Technology sells to Deere for $305 million", Sep. 7, 2017, retrieved on Jun. 20, 2022 from www.therobotreport.com/startup-blue-river-technology-sells-deere-305-million/, 12 pages.
Steve Crowe, "John Deere Acquires Light's Camera-Based Perception Platform", May 19, 2022, retrieved on Jun. 20, 2022 from www.therobotreport.com/john-deere-acquires-light-camera-based-perception-platform/, 12 pages.
TRL Off-Highway Automated Vehicles Code of Practice, 2021, retrieved on Aug. 22, 2022 from trl.co.uk/uploads/trl/documents/PPR994-Off-Highway-AV-CoP_v3.pdf, 40 pages.
Steve Crowe, "John Deere Acquiring Bear Flag Robotics For $250M", Aug. 5, 2021, retrieved on Jun. 20, 2022 from www.therobotreport.com/john-deere-acquiring-bear-flag-robotics-250m/, 11 pages.
Steve Crowe, "Oxbotica Pilots Safety Framework For Off-Road Autonomous Driving", Jun. 7, 2021, retrieved on Jun. 20, 2022 from www.therobotreport.com/oxbotica-pilots-safety-framework-off-road-autonomous-driving/, 11 pages.
Brianna Wessling, "MIT Researchers Help Robots Navigate Uncertain Environments", May 24, 2022, retrieved on Jun. 20, 2022 from www.therobotreport.com/mit-researchers-help-robots-navigate-uncertain-environments/, 10 pages.
Carnegie Mellon University National Robotics Engineering Center—Off-Road Autonomy, retrieved on Aug. 22, 2022 from https://www.nrec.ri.cmu.edu/solutions/defense/other-projects/off-road-autonomy.html, 5 pages.
Greg Nichols, "Off Road: Autonomous Driving's New Frontier Requires a New Kind of Sensor", Apr. 14, 2021, retrieved on Jun. 20, 2022 from www.zdnet.com/article/off-road-autonomous-drivings-new-frontier-requires-a-new-kind-of-sensor/, 15 pages.
Tagolas Magma X2 Datasheet, retrieved on Aug. 22, 2022 from www.taoglas.com/datasheets/AA.175.301111.pdf, 20 pages.
LIVOX Mid-40/Mid-100 LiDAR Specs, retrieved on Aug. 22, 2022 from https://www.livoxtech.com/mid-40-and-mid-100/specs, 2 pages.
Elaine Ball, "Top Benefits of Using LiDAR For Construction Projects", Oct. 1, 2020, retrieved from https://csengineermag.com/top-benefits-of-using-lidar-for-construction-projects/ on Nov. 4, 2022, 4 pages.
"Press Release: Baraja Announces First Volume Commercial LiDAR Deal With Hitachi Construction Machinery", Oct. 12, 2021, retrieved from https://www.baraja.com/en/blog/press-release-baraja-announces-first-volume-commercial-lidar-deal-with-hitachi-construction on Nov. 4, 2022, 6 pages.

(56) References Cited

OTHER PUBLICATIONS

Peter Brown, "LiDAR Improves Efficiency and Safety In Industrial Heavy Equipment", Oct. 22, 2021, retrieved from https://electronics360.globalspec.com/article/17336/lidar-improves-efficiency-and-safety-in-industrial-heavy-equipment on Nov. 4, 2022, 2 pages.

"Construction Remains Ahead in Autonomous Vehicles", Oct. 4, 2019, retrieved from https://www.constructionequipment.com/earthmoving/rigid-frame-trucks-off-highway/article/10756443/construction-remains-ahead-in-autonomous-vehicles on Nov. 4, 2022, 4 pages.

"LiDAR for Heavy Machinery", retrieved from https://innoviz.tech/applications/industrial on Nov. 4, 2022, 2 pages.

"Hitachi Construction Machinery Invests in Nextgen LiDAR . . . ", Mar. 29, 2021, retrieved from https://lidarnews.com/press-releases/hitachi-construction-machinery-invests-in-nextgen-lidar/ on Nov. 4, 2022, 2 pages.

Nakagawa et al., "Real-Time Mapping of Construction Workers Using Multilayered LiDAR", The 40th Asian Conference on Remote Sensing 2019, Oct. 14-18, 2019, 8 pages.

Sabbir Rangwala, "LiDAR Vision—Helping Bring Autonomous Trucks to Your Neighborhood", Dec. 17, 2020, retrieved from https://www.forbes.com/sites/sabbirrangwala/2020/12/17/lidar-visionhelping-bring-autonomous-trucks-to-your-neighborhood/ on Nov. 4, 2022, 9 pages.

"Collision Warning on the Rear of an Excavator With 3D LiDAR Sensors", retrieved from https://www.sick.com/ca/en/industries/mobile-automation/construction-and-mining-machines/excavator/collision-warning-on-the-rear-of-an-excavator-with-3d-lidar-sensors/c/p549945 on Nov. 4, 2022, 1 page.

"Autonomous Construction Vehicles", retrieved from https://www.technologycards.net/english/the-technologies/autonomous-construction-vehicles on Nov. 4, 2022, 2 pages.

* cited by examiner

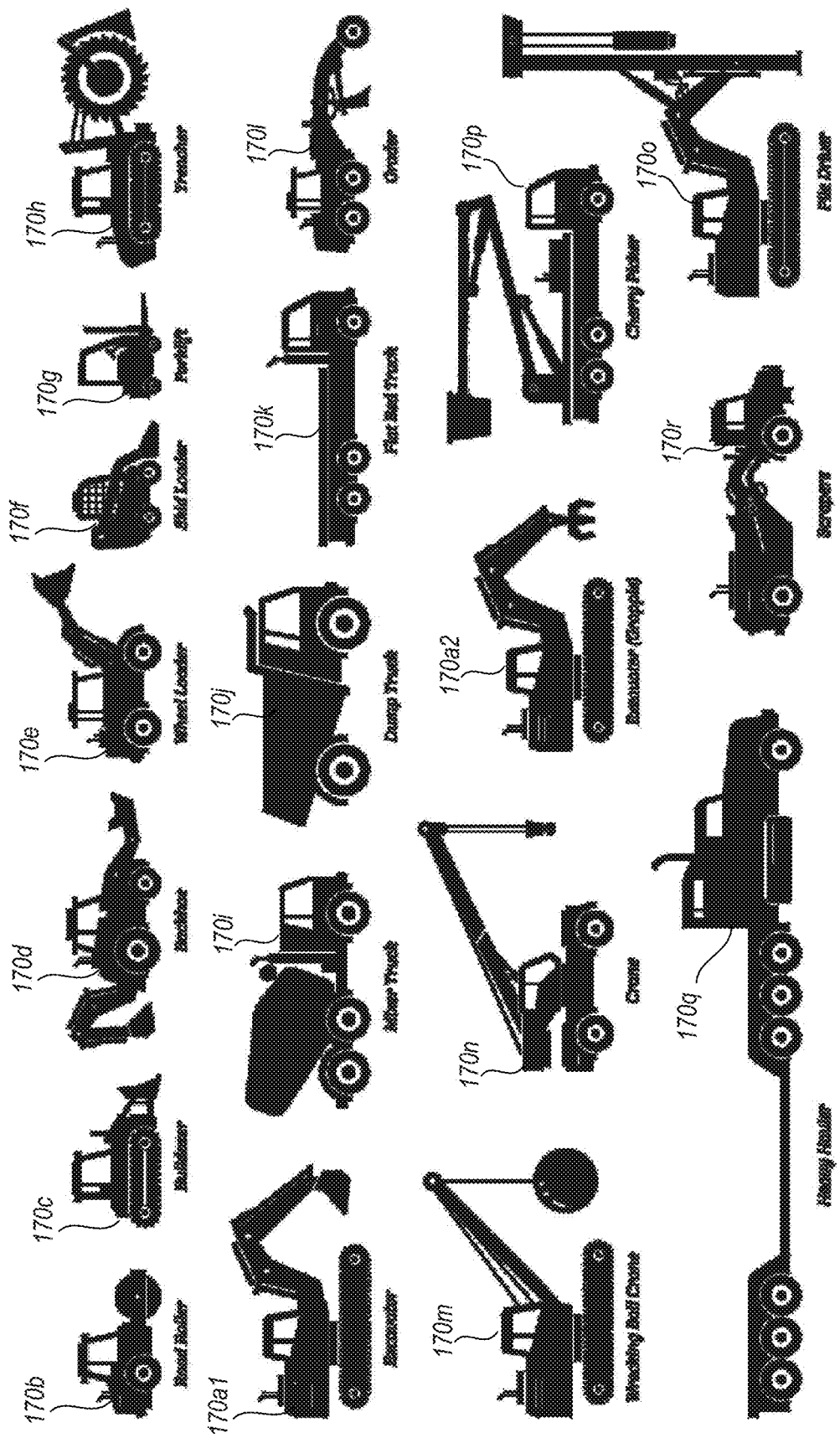

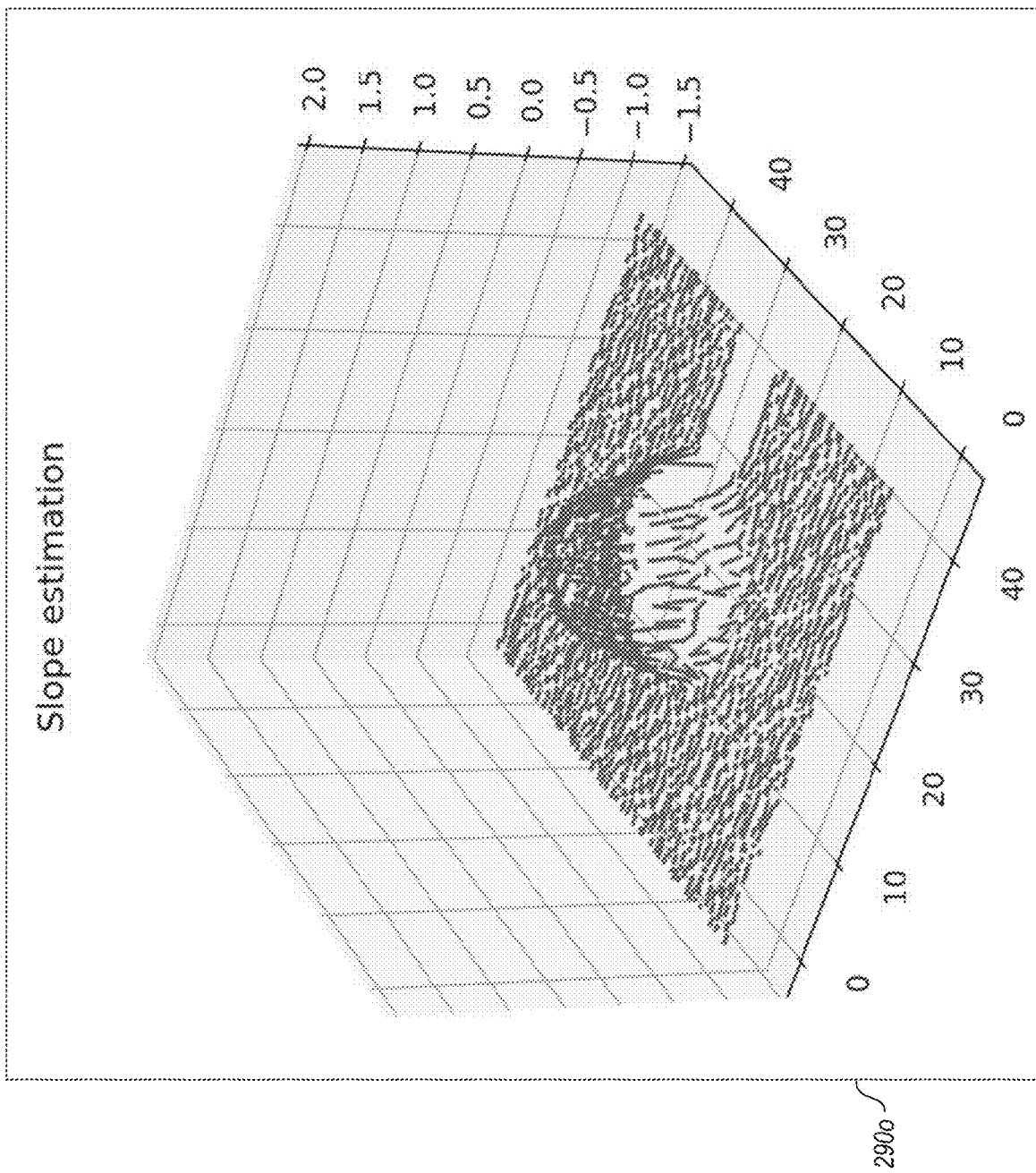
FIG. 2-O

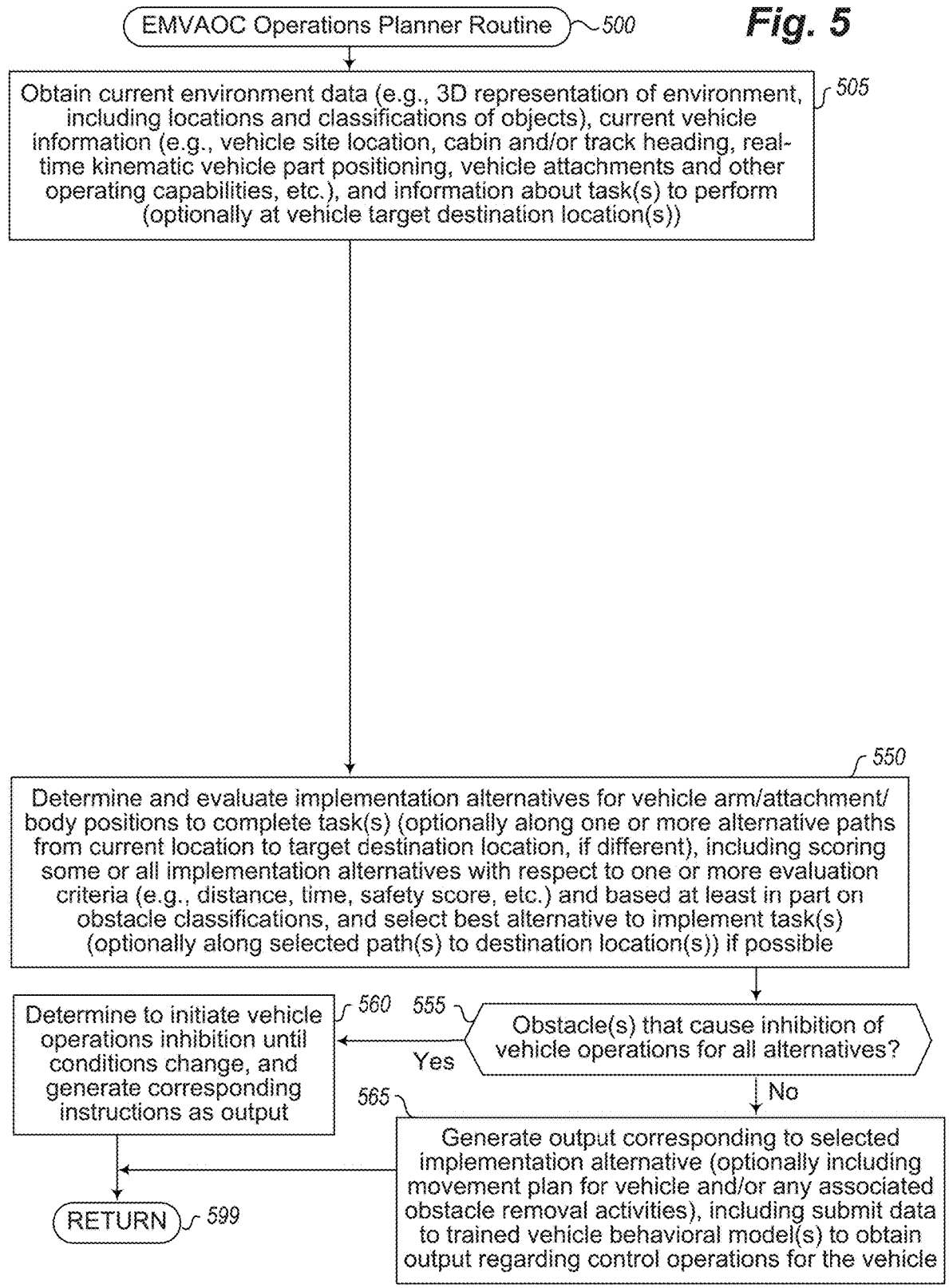

US 11,746,501 B1

AUTONOMOUS CONTROL OF OPERATIONS OF POWERED EARTH-MOVING VEHICLES USING DATA FROM ON-VEHICLE PERCEPTION SYSTEMS

CROSS REFERENCE TO RELATED APPLICATIONS

This application claims the benefit of U.S. Provisional Patent Application No. 63/401,928, filed Aug. 29, 2022 and entitled "Autonomous Control Of Operations Of Powered Earth-Moving Vehicles Using Data From On-Vehicle Perception Systems," which is hereby incorporated by reference in its entirety.

TECHNICAL FIELD

The following disclosure relates generally to systems and techniques for autonomous control of operations of powered earth-moving vehicles, such as to determine and implement autonomous operations of one or more construction and/or mining vehicles on a site based at least in part on data gathered by on-vehicle perception systems about a surrounding environment, including controlling movement of vehicle arms and/or attachments to move on-vehicle sensors to gather additional data.

BACKGROUND

Earth-moving construction vehicles may be used on a job site to move soil and other materials (e.g., gravel, rocks, asphalt, etc.) and to perform other operations, and are each typically operated by a human operator (e.g., a human user present inside a cabin of the construction vehicle, a human user at a location separate from the construction vehicle but performing interactive remote control of the construction vehicle, etc.). Similarly, earth-moving mining vehicles may be used to extract or otherwise move soil and other materials (e.g., gravel, rocks, asphalt, etc.) and to perform other operations, and are each typically operated by a human operator (e.g., a human user present inside a cabin of the mining vehicle, a human user at a location separate from the mining vehicle but performing interactive remote control of the mining vehicle, etc.).

Limited autonomous operations (e.g., performed under automated programmatic control without human user interaction or intervention) of some construction and mining vehicles have occasionally been used, but existing techniques suffer from a number of problems, including the use of limited types of sensed data, an inability to perform fully autonomous operations when faced with on-site obstacles, an inability to coordinate autonomous operations between multiple on-site construction and/or mining vehicles, requirements for bulky and expensive hardware systems to support the limited autonomous operations, etc.

BRIEF DESCRIPTION OF THE DRAWINGS

FIGS. 2A-2I illustrate examples of earth-moving construction and/or mining vehicles and types of on-vehicle data sensors positioned to support autonomous operations on a site.

FIGS. 2J-2O illustrate examples of components and interactions and information used in gathering data by on-vehicle perception systems and using the data as part of implementing autonomous operations of one or more earth-moving construction and/or mining vehicles on a site.

FIG. 5 is an example flow diagram of an illustrated embodiment of an EMVAOC Operations Planner routine.

DETAILED DESCRIPTION

Figure 1A:
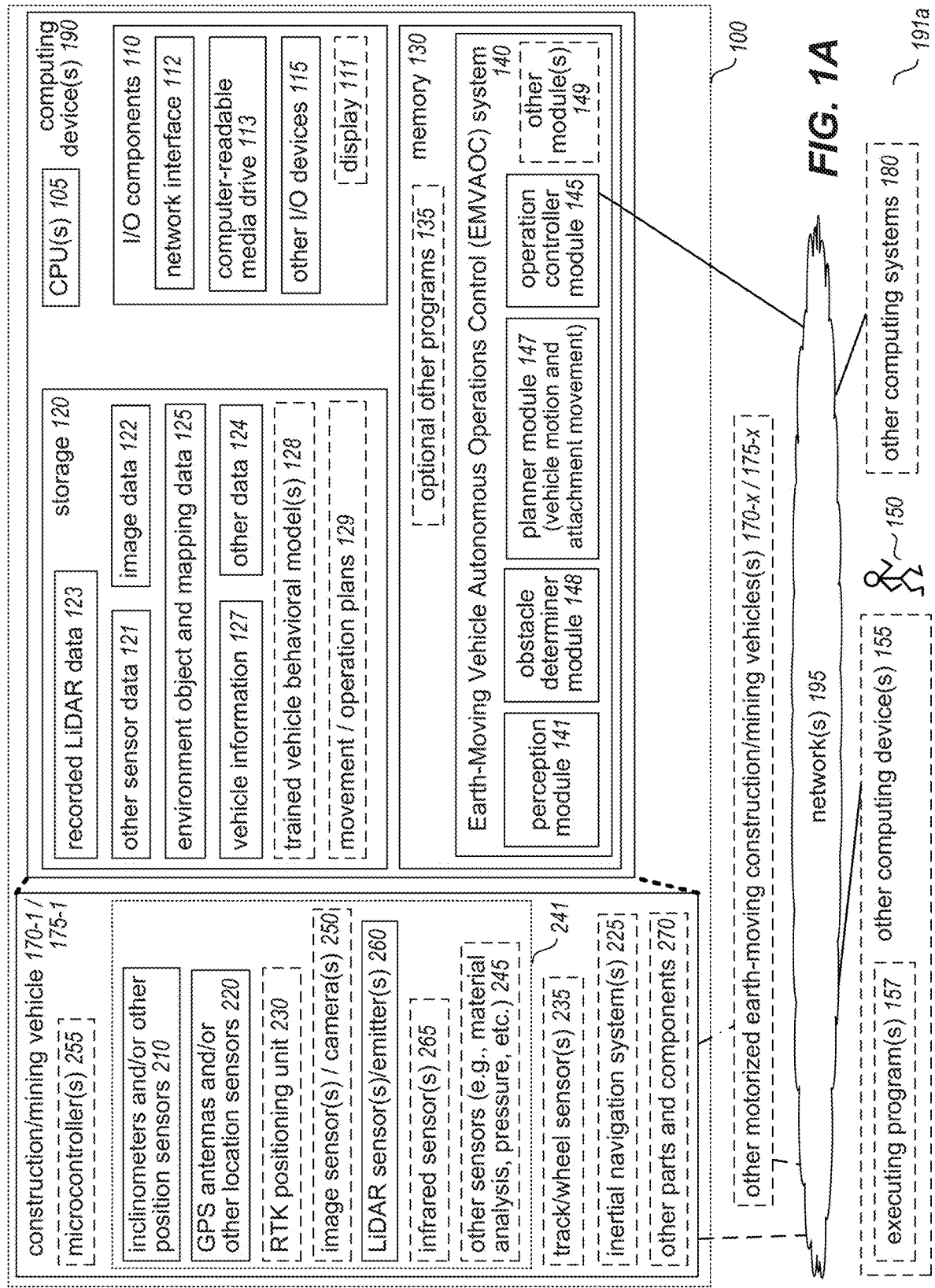
FIG. 1A is a network diagram illustrating an example embodiment of using described systems and techniques to determine and implement autonomous operations of one or more earth-moving construction and/or mining vehicles on a site based at least in part on data gathered by on-vehicle perception systems.

Systems and techniques are described for implementing autonomous control of operations of powered earth-moving vehicles (e.g., construction vehicles and/or mining vehicles), such as to automatically determine and control autonomous movement of part or all of one or more such vehicles (e.g., a vehicle's arm(s) and/or tool attachment(s)) to move materials or perform other actions in a manner that is based at least in part on data gathered by on-vehicle perception systems about an environment surrounding the vehicle(s). In at least some embodiments, a perception system on a powered earth-moving vehicle includes one or more LiDAR components (e.g., light emitters and light detector/receiver sensors) that repeatedly (e.g., continuously) map an environment around the vehicle, such as to determine a 3D (three-dimensional) point cloud with 3D data points reflecting the shape and contour of surrounding ground and any nearby objects (e.g., man-made structures, rocks and other naturally occurring impediments, other equipment, people or animals, etc.)— in some such embodiments, a LiDAR component on a powered earth-moving vehicle may be mounted on or otherwise attached to a component part of the vehicle that is moveable independently of a chassis of the vehicle (e.g., a hydraulic arm or a tool attachment), and the automated operations may further include moving the component (e.g., rotating the hydraulic arm or tool attachment, such as to raise or lower the component) in a manner to gather additional data about the environment, such as data about one or more additional areas of the environment that were not perceptible before moving the component. The positions of the gathered 3D LiDAR data points may be further represented in coordinates relative to a position of the LiDAR component, and the generation of a 3D map or other 3D representation of the environment around the vehicle may further include determining the 3D position of the LiDAR component (e.g., using a combination of absolute GPS coordinates and relative inclinometer angular position data), and using that determined 3D position to adjust the coordinates of the gathered 3D LiDAR data points to reflect absolute locations that are included in the generated 3D representation of the surrounding environment.

In addition, in at least some embodiments, the automated operations may further include supplementing and/or further analyzing the gathered LiDAR data. For example, in at least some embodiments and situations, the gathered LiDAR data may be further supplemented with one or more additional types of gathered data (e.g., RGB visual data from image sensors, infrared data from infrared sensors, data from ground-penetrating radar and/or above-ground radar, etc.), including to map the additional gathered data to the same coordinate system used for the generated 3D representation. The gathered environment data of the generated 3D representation may be further analyzed in some embodiments to determine additional types of information (e.g., to classify types of obstacles of detected objects, to generate a rendered image that is a visual map of some or all of the surrounding environment for display, etc.). The described systems and techniques may further use the gathered environment data and resulting determined information from one or more powered earth-moving vehicles to further determine and implement fully autonomous operations of one or more of those vehicles in accordance with one or more defined tasks (e.g., dig a hole of a specified size and/or shape and/or at a specified location, move one or more rocks from a specified area, extract a specified amount of one or more materials, remove hazardous or toxic material from above ground and/or underground, etc.) and/or other goals, including in at least some embodiments and situations to do so in light of identified obstacles and/or to implement coordinated actions of multiple such earth-moving vehicles of one or more types. Additional details related to implementing autonomous control of earth-moving vehicles in particular manners are described below, and some or all of the described techniques are performed in at least some embodiments by automated operations of an Earth-Moving Vehicle Autonomous Operations Control ("EMVAOC") system to control one or more earth-moving vehicles of one or more types (e.g., an EMVAOC system operating on at least one of one or more earth-moving vehicles being controlled).

As is noted above, the automated operations of an EMVAOC system may include using one or more LiDAR components on a powered earth-moving vehicle to scan areas around the earth-moving vehicle and map those areas, such as to determine a set of 3D data points reflecting the terrain around the earth-moving vehicle (e.g., to correspond to the shape and contour of surrounding ground and objects). In at least some such embodiments, a perception system of the EMVAOC system may then use the 3D data points in combination with additional location and positioning data (e.g., inclinometer data, RTK data, etc.) to generate a 3D point cloud representing the terrain around the earth-moving vehicle, such as in relation to a job site within which the earth-moving vehicle is located—the perception system used for a powered earth-moving vehicle may be located in part or in whole on the vehicle, such as to include the sensors and other hardware components used to gather the environment and location/positioning data, and to include a perception module with software instructions that execute on the vehicle (e.g., using one or more microcontrollers, such as part of a self-contained control unit that is positioned on the vehicle and that executes without a cooling unit). In addition, if multiple such earth-moving vehicles each has one or more such LiDAR components and optionally additional location and positioning sensors, the 3D data points from some or all such earth-moving vehicles may be combined, such as to create a 3D point cloud or other 3D representation of the terrain of some or all of the job site.

In addition, in at least some embodiments and situations, the environment data that is gathered and analyzed by the EMVAOC system may be further used in other automated manners to provide additional enhanced functionality, whether in addition to or instead of as part of automatically determining and controlling autonomous operations of part or all of one or more powered earth-moving vehicles. Non-exclusive examples of such other uses of such environment data to provide additional enhanced functionality include the following:

providing security for one or more powered earth-moving vehicles each having a perception system as described herein, and/or for one or more job sites on which the earth-moving vehicle(s) are located (e.g., if people and/or animals approach such an earth-moving vehicle and/or other part of a job site, such as another vehicle that does not have its own perception system, to sound an alarm and/or take other actions to protect the vehicle(s) and/or job site, such as to notify designated users and/or initiate automated vehicle movement actions);

generating analytics information for some or all of a job site, such as from a single earth-moving vehicle on the site having a perception system as described herein or by aggregating information from multiple perception systems of multiple such earth-moving vehicles, including information of a variety of types (e.g., about a number of vehicles of one or more types that are currently on the site or have passed through it during a designated period of time; about a number of people of one or more types, such as workers or visitors, that are currently on the site or have passed through it during a designated period of time; about activities of a particular vehicle and/or a particular person at a current time and/or during a designated period of time, such as vehicles and/or people that are early or late with respect to a defined time or schedule, identifying information about vehicles and/or people such as license plates or RFID transponder IDs or faces or gaits; about other types of site activities, such as material deliveries and/or pick-ups, tasks being performed, etc.);

automated configuration and/or calibration activities for LiDAR and/or image sensors, such as by taking readings and matching them to existing 3D representations of the environment (e.g., terrain maps, photospheres, etc.), including to automatically determine a position on an earth-moving vehicle at which a particular sensor has been mounted or is otherwise located, and whether done once (e.g., configuration and/or calibration at initial installation) and/or repeatedly (e.g., continuous calibration); etc.

As noted above, in at least some embodiments, data may be obtained and used by the EMVAOC system from LiDAR sensors (depth and position data for points visible from the LiDAR sensors) and optionally additional sensors of multiple types that are positioned on or near one or more powered earth-moving vehicles, such as one or more of the following: GPS data or other location data; inclinometer data or other position data for particular movable component parts of an earth-moving vehicle (e.g., a digging arm/attachment of an earth-moving vehicle), real-time kinematic (RTK) positioning information based on GPS data and/or other positioning data that is corrected using RTK-based GPS correction data signals transmitted from a base station (e.g., at a location remote from the site at which the vehicle is located), track and cabin heading data, visual data of captured image(s), depth data from depth-sensing and proximity devices other than LiDAR (e.g., ground-penetrating radar, above-ground radar, stereo cameras, etc.), infrared data from infrared sensors, material type data for loads and/or a surrounding environment from material analysis sensors, load weight data from pressure sensors, etc. As one non-exclusive example, the described systems and techniques may in some embodiments include obtaining and integrating data from sensors of multiple types positioned on a powered earth-moving vehicle at a site, and using the data to determine and control operations of the vehicle to accomplish one or more defined tasks at the site (e.g., dig a hole of a specified size and/or shape and/or at a specified location, move one or more rocks from a specified area, extract a specified amount of one or more materials, remove hazardous or toxic material from above ground and/or underground, perform trenching, perform demining, perform breaching, etc.), including determining current location and positioning of the vehicle on the site. Such powered earth-moving construction vehicles (e.g., one or more tracked or wheeled excavators, bulldozers, tracked or wheeled skid loaders or other loaders such as front loaders and backhoe loaders, graders, cranes, compactors, conveyors, dump trucks or other trucks, deep sea construction machinery, extra-terrestrial construction machinery, etc.) and powered earth-moving mining vehicles (e.g., one or more tracked or wheeled excavators, bulldozers, tracked or wheeled skid loaders and other loaders such as front loaders and backhoe loaders, scrapers, graders, cranes, trenchers, dump trucks or other trucks, deep sea mining machinery, extra-terrestrial mining machinery, etc.) are referred to generally as 'earth-moving vehicles' herein, and while some illustrative examples are discussed below with respect to controlling one or more particular types of vehicles (e.g., excavator vehicles, wheel loaders or other loader vehicles, dump truck or other truck vehicles, etc.), it will be appreciated that the same or similar techniques may be used to control one or more other types of powered earth-moving vehicles (e.g., vehicles used by military and/or police for operations such as breaching, demining, etc., including demining plows, breaching vehicles, etc.). With respect to sensor types, one or more types of GPS antennas and associated components may be used to determine and provide GPS data in at least some embodiments. In addition, one or more types of LiDAR devices may be used in at least some embodiments to determine and provide depth data about an environment around an earth-moving vehicle (e.g., to determine a 3D, or three-dimensional, model or other 3D representation of some or all of a job site on which the vehicle is situated)—in some embodiments, other types of depth-sensing and/or 3D modeling techniques may be used, whether in addition to or instead of LiDAR, such as using other laser rangefinding techniques, synthetic aperture radar or other types of radar, sonar, image-based analyses (e.g., SLAM, SfM, etc.), structured light, via stereo cameras, etc. Furthermore, one or more proximity sensor devices may be used to determine and provide short-distance proximity data in at least some embodiments. Moreover, real-time kinematic positioning information may be determined from a combination of GPS data and other positioning data, such as in combination with an inertial navigation system and/or a radio that receives RTK correction data. Other hardware components that may be positioned on or near an earth-moving vehicle and used to provide data and/or functionality used by the EMVAOC system include the following: one or more inclinometers (e.g., single axis and/or double axis) or other accelerometers; a CAN bus message transceiver; one or more low-power microcontrollers, such as to execute and use executable software instructions and associated data of some or all of the EMVAOC system; one or more voltage converters and/or regulators; a voltage level shifter; etc. In addition, in at least some embodiments and situations, one or more types of data from one or more sensors positioned on an earth-moving vehicle may be combined with one or more types of data (whether the same types of data and/or other types of data) acquired from one or more positions remote from the earth-moving vehicle (e.g., from an overhead location, such as from a drone aircraft, an airplane, a satellite, etc.; elsewhere on a site on which the earth-moving vehicle is located, such as at a fixed location and/or on another earth-moving vehicle of the same or different type; etc.), with the combination of data used in one or more types of autonomous operations as discussed herein. Additional details are included below regarding positioning of data sensors and use of corresponding data, including with respect to the examples of FIGS. 2A-2I.

As is also noted above, in addition to detecting and identifying terrain and objects around an earth-moving vehicle, the automated operations of an EMVAOC system may include determining current location and other positioning of the earth-moving vehicle on a site in at least some embodiments. As one non-exclusive example, such position determination may include using one or more track and/or wheel sensors to monitor whether or not the earth-moving vehicle's tracks and/or wheels are aligned in the same direction as the cabin (e.g., for excavators and other types of earth-moving vehicles in which the cabin and other parts of the chassis can rotate or otherwise move relative to the vehicle's tracks and/or wheels), and using GPS data (e.g., from 3 GPS antennas located on an earth-moving vehicle cabin, such as in a manner similar to that described with respect to FIGS. 2B and 2C) and optionally in conjunction with an inertial navigation system to determine the rotation of the cabin chassis (e.g., relative to true north), as well as to determine an absolute location of the vehicle's chassis/body and/or other parts. When using data from multiple GPS antennas, the data may be integrated in various manners, such as using a microcontroller located on the earth-moving vehicle, and with additional RTK (real-time kinematic) positioning data used to provide an RTK-enabled GPS positioning unit that reinforces and provides further precision with respect to the GPS-based location (e.g., to achieve 1-inch precision or better). LiDAR data may further be used to assist in position determination operations, such as by surveying the surroundings of the earth-moving vehicle (e.g., an entire job site on which the earth-moving vehicle is located) and confirming a current location of the earth-moving vehicle (e.g., relative to a three-dimensional, or 3D, map or other 3D representation of the job site generated from the LiDAR data). Additional details are included below regarding such automated operations to determine current location and other positioning of an earth-moving vehicle on a site.

For illustrative purposes, some embodiments are described below in which specific types of data are acquired and used in specific manners for specific types of automated operations performed for specific types of earth-moving vehicles, and in which specific types of autonomous operation activities and/or other automated activities are performed in particular manners. However, it will be understood that such described systems and techniques may be used with other types of data and vehicles and associated autonomous operation activities in other manners in other embodiments, and that the invention is thus not limited to the exemplary details provided. In addition, the terms "acquire" or "capture" or "record" as used herein with reference to sensor data may refer to any recording, storage, or logging of media, sensor data, and/or other information related to an earth-moving vehicle or job site or other location or subsets thereof (unless context clearly indicates otherwise), such as by a recording device or by another device that receives information from the recording device. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical reference numbers may be used in the drawings to identify the same or similar elements or acts.

FIG. 1A is a diagram illustrating information 191a including an example embodiment of an EMVAOC ("Earth-Moving Vehicle Autonomous Operations Control") system 140 that may be used to implement at least some of the described systems and techniques for implementing autonomous control of earth-moving vehicles based at least in part on environment data gathered by on-vehicle perception systems, such as to automatically determine and control fully autonomous movement of an earth-moving vehicle's arm(s) and/or attachment(s) (e.g., digging bucket) and/or body/chassis to move materials or perform other actions in accordance with specified tasks. The EMVAOC system 140 may be implemented on one or more network-accessible configured computing devices 190, whether integrated 100 with a particular powered earth-moving construction vehicle 170-1 or powered earth-moving mining vehicle 175-1 (e.g., located on that earth-moving vehicle), or integrated with multiple earth-moving vehicles 170 and/or 175 (e.g., that include earth-moving vehicle 170-1 or 175-1 and further include one or more other earth-moving vehicles 170-x and/or 175-x, such as operating in a distributed manner on the multiple earth-moving vehicles and with one computing device 190 on each of the multiple vehicles that are interacting in a peer-to-peer manner or via a centralized other computing system, not shown) on the same job site or otherwise working together, or instead remote from one or more such earth-moving vehicles 170 and/or 175 (e.g., in communication with one or more such earth-moving vehicles over one or more networks 195, such as from a location on a same job site as the one or more vehicles and/or from a remote location). In some embodiments, one or more other computing devices or systems may further interact with the EMVAOC system 140 (e.g., to obtain and/or provide information), such as other computing device(s) 155 each having one or more associated users 150 (e.g., remote operator users for one or some or all of the vehicles 170 and/or 175), and/or other computing system(s) 180 (e.g., to store and provide data, to provide supplemental computing capabilities, etc.). The computing device(s) 190 may include any computing device or system that may perform the described techniques as discussed herein, such as to receive data and/or requests, take corresponding actions (e.g., store data, respond to requests, etc.), and in at least some embodiments are implemented as a self-contained control unit on a vehicle that has one or more microcontrollers to implement at least some of the EMVAOC system and that in some embodiments operates without a cooling unit. The earth-moving vehicle(s) 170 and/or 175 may correspond to various types of vehicles and have various forms, such as are illustrated in FIGS. 2A-2I.

In this example, earth-moving vehicle 170-1 or 175-1 includes a variety of sensors to obtain/determine information about the vehicle and its surrounding environment (e.g., a job site on which the vehicle is located), including one or more LiDAR components (e.g., emitters and/or sensors) 260, optionally one or more image sensors 250 (e.g., part of one or more cameras or other image capture devices), one or more GPS antennas and/or other location sensors 220, one or more inclinometers and/or other position sensors 210, optionally one or more infrared sensors 265, optionally one or more inertial navigation systems 225, optionally an RTK-enabled GPS positioning unit 230 that receives GPS signals from the GPS antenna(s) and RTK-based correction data from a remote base station (not shown) and optionally other data from one or more other sensors and/or devices (e.g., the inertial navigation system), optionally one or more track or wheel alignment sensors 235, optionally one or more other sensors or other components 245 (e.g., material analysis sensors, pressure sensors, radar, ground-penetrating radar, sonar, etc.), other parts and components 270 (e.g., hydraulic arms, tool attachments, chassis, tracks or wheels, etc.), optionally one or more microcontrollers or other hardware CPUs 255 (e.g., to execute some or all of perception module 141 on the vehicle), etc.

The EMVAOC system 140 obtains some or all of the data from the sensors on the earth-moving vehicle 170-1 or 175-1 (and optionally from other vehicles 170 and/or 175, such as if they are being controlled by the EMVAOC system and/or if they share data between vehicles), stores the data in corresponding databases or other data storage formats on storage 120 (e.g., LiDAR data 123; earth-moving vehicle information 127; image data 122; other sensor data 121; etc.), and uses the data to perform automated operations involving controlling autonomous operations of the earth-moving vehicle 170-1 or 175-1 (and optionally other vehicles 170 and/or 175)— as part of such automated operations, additional data may be generated or otherwise determined (e.g., environment data 125, such as mapping data, object data; determined movement and/or operation plans 129; actual operational data from the vehicle, such as for use in later training or retraining/updating one or more behavioral models and stored in other data 124; etc.) and/or used (e.g., one or more trained vehicle behavioral models 128) and stored on the storage 120. In this example embodiment, the EMVAOC system 140 has modules that include a perception module 141, such as to analyze environment data (e.g., a 3D point cloud from one or more LiDAR components), to determine additional types of information (e.g., to classify types of obstacles of detected objects, such as in conjunction with an obstacle determiner module 148), to generate a 3D terrain contour map or other visual map of some or all of the surrounding environment (e.g., a map with a number of defined cells, such as each being 20 cm by 20 cm in real-world measurements, and having at least one value based on one or more of the 3D point cloud data points included in that cell, such as to represent height and/or slope for that cell), etc.; an operational controller module 145 that uses the trained behavioral model(s) to control autonomous operation (e.g., fully autonomous operation) of the earth-moving vehicle(s) 170 and/or 175 to perform one or more determined tasks; an obstacle determiner module 148 that uses data gathered by the perception module 141 to determine information about potential obstacles in an environment of the earth-moving vehicle(s) 170 and/or 175 (e.g., a position of the obstacle, a type of material of the obstacle, a classification of the type of the obstacle, etc.); a planner module 147 that controls overall operations of the earth-moving vehicle(s) for a job site (e.g., determines how to accomplish a goal that may include moving the earth-moving vehicle(s) 170 and/or 175 from current location(s) to determined target destination location(s), including to determine how to handle any obstacles between the current and destination locations); and optionally one or more other modules 149 to perform additional automated operations and provide additional capabilities (e.g., analyzing and describing a job site or other surrounding environment, such as quantities and/or types and/or locations and/or activities of vehicles and/or people; one or more GUI modules, including to optionally support one or more VR (virtual reality) headsets/glasses and/or one or more AR (augmented reality) headsets/glasses and/or mixed reality headsets/glasses optionally having corresponding input controllers, such as part of one or more of the other computing devices 155; one or more simulation modules to generate simulated operational data; one or more training modules to generate and/or train the behavioral model(s) using simulated and/or actual operational data; etc.). The perception module 141 and associated sensors and devices 241 may together form a perception system 151 that performs at least some of the described techniques, as illustrated in FIG. 2J—alternatively, the perception module 141 may further include the obstacle determiner module 148, and/or the obstacle determiner module 148 may be a part of a larger safety module (not shown) within the EMVAOC system 140. During operation, the EMVAOC system may generate or otherwise obtain various types of additional data and optionally store that additional data on storage 120 or elsewhere, such as current location and/or positioning information for an earth-moving vehicle and/or a destination location (e.g., as part of earth-moving vehicle information 127) and/or one or more determined routes or paths (e.g., as part of movement and/or operation plans 129), obstacle classification data (e.g., as part of the object and mapping data 125), etc. Additional details related to the EMVAOC system 140 are included elsewhere herein.

In this example embodiment, the one or more computing devices 190 include a copy of the EMVAOC system 140 stored in memory 130 and being executed by one or more hardware CPUs 105 (e.g., one or more low-power microcontrollers 255 if one or more corresponding computing devices 190 are located on one or more earth-moving vehicles 170/175, one or more GPUs or other processors, etc.)—software instructions of the EMVAOC system 140 may further be stored on storage 120 (e.g., for loading into memory 130 at a time of execution), but are not illustrated here. Computing device(s) 190 and EMVAOC system 140 may be implemented using a plurality of hardware components that form electronic circuits suitable for and configured to, when in combined operation, perform at least some of the techniques described herein. In the illustrated embodiment, each computing device 190 includes the hardware CPU(s) 105 (e.g., microprocessors or microcontrollers, optionally including one or more microcontrollers 255), storage 120, memory 130, and various input/output ("I/O") components 110, with the illustrated I/O components including a network connection interface 112, a computer-readable media drive 113, optionally a display 111, and other I/O devices 115 (e.g., keyboards, mice or other pointing devices, microphones, speakers, one or more VR headsets and/or glasses with corresponding input controllers, one or more AR headsets and/or glasses with corresponding input controllers, one or more mixed reality headsets and/or glasses with corresponding input controllers, etc.), although in other embodiments at least some such I/O components may not be provided. The memory may further include one or more optional other executing software programs 135 (e.g., an engine to provide output to one or more VR and/or AR and/or mixed reality devices and optionally receive corresponding input). The other computing devices 155 and computing systems 180 may include hardware components similar to or the same as some or all of those of a computing device 190 (and execute software programs, such as executing program(s) 157 on computing device(s) 155), but with those details about hardware components and particular executing software programs being omitted for the sake of brevity.

As noted above, one or more other powered earth-moving construction vehicles 170-x and/or powered earth-moving mining vehicles 175 may similarly be present (e.g., on the same job site as earth-moving vehicle 170-1 or 175-1) and include some or all such components and modules 210-270 and/or 105-149 (although not illustrated here for the sake of brevity) and have corresponding autonomous operations controlled by the EMVAOC system 140 (e.g., with the EMVAOC system operating on a single earth-moving vehicle and communicating with the other earth-moving vehicles via wireless communications, with the EMVAOC system executing in a distributed manner on some or all of the earth-moving vehicles, etc.) or by another copy of the EMVAOC system (e.g., with each earth-moving vehicle having a separate copy of the EMVAOC system executing on that earth-moving vehicle and optionally operating in coordination with each other, etc.). The network 195 may be of one or more types (e.g., the Internet, one or more cellular telephone networks, etc.) and in some cases may include or be replaced by direct wireless communications between two or more devices (e.g., via Bluetooth; LoRa, or Long Range Radio; etc.). In addition, while the example of FIG. 1A includes various types of data gathered for an earth-moving vehicle and its surrounding environment, other embodiments may similarly gather and use other types of data, whether instead of or in addition to the illustrated types of data, including non-exclusive examples of image data in one or more light spectrums, non-light energy data, location data of types other than from satellite-based navigation systems, other types of depth or distance data to objects, sound data, overhead imagery and other data, etc. In addition, in some embodiments and situations, different devices and/or sensors may be used to acquire the same or overlapping types of data (e.g., simultaneously or sequentially), and the EMVAOC system may combine or otherwise use such different types of data (e.g., using sensor fusion techniques), including to determine differential information for a type of data using multiple sources of that data type.

It will be appreciated that computing devices, computing systems and other equipment (e.g., earth-moving vehicles) included within FIG. 1A are merely illustrative and are not intended to limit the scope of the present invention. The systems and/or devices may instead each include multiple interacting computing systems or devices, and may be connected to other devices that are not specifically illustrated, including via Bluetooth communication or other direct inter-device communication, a mesh network, through one or more networks such as the Internet, via the Web, or via one or more private networks (e.g., mobile communication networks), etc. More generally, a computing device or other system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, camera devices and accessories, and various other consumer products that include appropriate communication capabilities. In addition, the functionality provided by the illustrated EMVAOC system 140 may in some embodiments be distributed in various modules, some of the described functionality of the EMVAOC system 140 may not be provided, and/or other additional functionality may be provided.

It will also be appreciated that, while various items are illustrated as being stored in memory or on storage while being used, these items or portions of them may be transferred between memory and other storage devices for purposes of memory management and data integrity and execution/use. Alternatively, in other embodiments some or all of the software modules and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the EMVAOC system 140 executing on computing device(s) 190) and/or data structures (e.g., trained vehicle behavioral model(s) 128; environment mapping data 125, such as a 3D point cloud and/or visual map; etc.), such as by execution of software instructions of the one or more software programs and/or by storage of such software instructions and/or data structures, and such as to perform algorithms as described in the flow charts and other disclosure herein. Furthermore, in some embodiments, some or all of the systems and/or modules may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 1B:
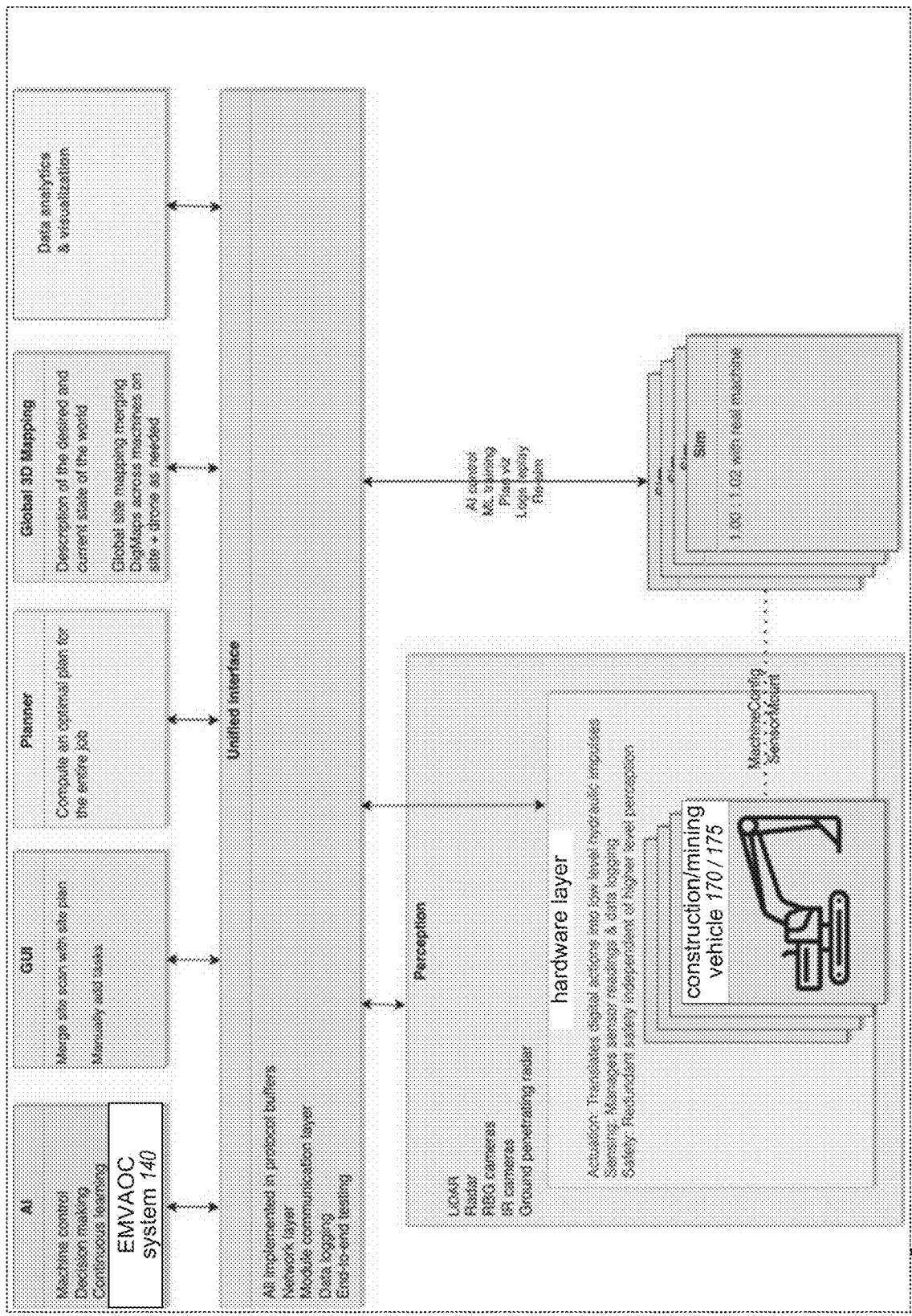
FIG. 1B is a diagram illustrating example components and interactions used to implement autonomous operations of one or more earth-moving construction and/or mining vehicles on a site.

FIG. 1B illustrates example modules and interactions used to implement autonomous operations of one or more earth-moving vehicles on a site, such as to provide an overview of a software and/or hardware architecture used for performing at least some of the described techniques in at least some embodiments. In particular, FIG. 1B illustrates information 191*b* that includes a hardware layer associated with one or more types of earth-moving construction vehicles 170 and/or earth-moving mining vehicles 175 (e.g., corresponding to components 210-270 of FIG. 1A), such as to receive instructions about controlling autonomous operation of the earth-moving vehicle(s) 170/175, and to perform actions that include actuation (e.g., translating digital action instructions into low-level hydraulic impulses), sensing (e.g., to manage sensor readings and data logging), safety (e.g., to perform redundant safety independent of higher-level perception operations), etc. In the illustrated example, the hardware layer interacts with or as part of a perception system 151 that includes hardware components used to gather data for perception module 141, such as to use one or more sensor types to obtain data about the earth-moving vehicle(s) and/or their environment (e.g., LiDAR data, radar data, visual data from one or more RGB camera devices, infrared data from one or more IR sensors, ground-penetrating radar data, etc.). The perception system and/or hardware layer may further interact with a unified interface that connects various modules, such as to operate a network layer and to be implemented in protocol buffers as part of providing a module communication layer, as well as to perform data logging, end-to-end testing, etc. In the illustrated example, the unified interface further interacts with an AI (artificial intelligence) module (e.g., that includes the EMVAOC system 140), a GUI module, a Planner module (e.g., planner module 147 that is part of the EMVAOC system 140), a Global 3D Mapping module, one or more Sim simulation modules (e.g., operational data simulator modules 149 that are part of the EMVAOC system 140), and one or more other modules to perform data analytics and visualization. In this example, the AI module provides functionality corresponding to machine control, decision-making, continuous learning, etc., while the planner module executes separately from the EMVAOC system 140, although the planner module may in some embodiments and situations also use AI techniques and optionally be included as part of the EMVAOC system 140. The GUI module perform activities that include providing information of various types to users (e.g., from the EMVAOC system), manually receiving information (e.g., to be provided to the EMVAOC system; to add tasks to be performed, such as for use by the Planner module; to merge a site scan with a site plan; etc.). The Planner module performs operations that may include computing an optimal plan for an entire job (e.g., with various tasks to be performed in sequence and/or serially). The Global 3D Mapping module performs activities that may include providing a description of a current state and/or desired state of an environment around the earth-moving vehicle(s), performing global site mapping merging (e.g., using DigMaps across earth-moving vehicles on the site and optionally drones, with each DigMap being a two-dimensional, or 2D, rendering of some or all of a 3D point cloud or other 3D map representation, such as using one data point per cell), etc., such as based at least in part on output data from the EMVAOC system 140 and perception module 141 (e.g., generated 3D point clouds), and may in some embodiments and systems operate as part of the EMVAOC system. The one or more Sim modules perform simulations to provide data from simulated operation of the one or more earth-moving vehicles, such as for use in AI control, machine learning neural network training (e.g., for one or more behavioral models), replaying logs, planning visualizations, etc. It will be appreciated that the EMVAOC system may be implemented in other architectures and environments in other embodiments, and that the details of FIG. 1B are provided for illustrative purposes. In addition, while not illustrated in FIG. 1B, in some embodiments one or more specialized versions of the EMVAOC system may be used for particular types of earth-moving vehicles, with non-exclusive examples including the following: an Excavator Operation and Training Control, or EOTC, system to train and control one or more types of construction and/or mining excavator vehicles using one or more corresponding trained behavioral models; an Excavator X Operation and Training Control, or EXOTC, system to train and control a particular construction and/or mining excavator X vehicle using one or more corresponding trained behavioral models; a Dump Truck Operation and Training Control, or DTOTC, system to train and control one or more types of construction and/or mining dump truck vehicles using one or more corresponding trained behavioral models; a Dump Truck X Operation and Training Control, or DTXOTC, system to train and control a particular construction and/or mining dump truck vehicle using one or more corresponding trained behavioral models; a Wheel Loader Operation and Training Control, or WLOTC, system to train and control one or more types of construction and/or mining wheel loader vehicles using one or more corresponding trained behavioral models; a Wheel Loader X Operation and Training Control, or WLXOTC, system to train and control a particular construction and/or mining wheel loader vehicle using one or more corresponding trained behavioral models; one or more other operation and training control systems specific to particular types of construction and/or mining vehicles other than excavators and dump trucks and wheel loaders; one or more other operation and training control systems specific to particular construction and/or mining vehicles other than excavators and dump trucks and wheel loaders; a Construction Vehicle Operation and Training Control, or CVOTC, system to train and control some or all types of construction vehicles using one or more corresponding trained behavioral models; a Mining Vehicle Operation and Training Control, or MVOTC, system to train and control some or all types of mining vehicles using one or more corresponding trained behavioral models; etc.).

As noted above, the EMVAOC system may in at least some embodiments include one or more obstacle determiner modules that detect and/or classify objects and other obstacles, and automated operations of an EMVAOC system may further include using the obstacle determiner modules as part of identifying and classifying obstacles (if any) involved in accomplishing one or more tasks, including in some embodiments and situations as part of moving an earth-moving vehicle along a desired route or path or otherwise between current and destination locations. For example, LiDAR data (or other depth-sensing data) and/or visual data, whether data from an environment above and/or below ground, may be analyzed to identify objects that are possible obstacles and as part of classifying a type of each obstacle, and other types of data (e.g., infrared) may be further used as part of classifying an obstacle type, such as to determine whether an obstacle is a human or animal (e.g., based at least in part by having a temperature above at least one first temperature threshold, whether an absolute temperature threshold or a temperature threshold relative to a temperature of a surrounding environment), whether an obstacle is a running vehicle (e.g., based at least in part by having a temperature above at least one second temperature threshold, such as a second temperature threshold higher than the first temperature threshold, and whether an absolute temperature threshold or a temperature threshold relative to a temperature of a surrounding environment), etc., and in some embodiments and situations by using one or more trained machine learning models (e.g., using a point cloud analysis routine for object classification) or via other types of analysis (e.g., image analysis techniques). As one non-exclusive example, each obstacle may be classified on a scale from 1 (easy to remove) to 10 (not passable), including to consider factors such as whether an obstacle is a human or other animal, is another vehicle that can be moved (e.g., using coordinated autonomous operation of the other vehicle), is infrastructure (e.g., cables, plumbing, etc.), based on obstacle size (e.g., using one or more size thresholds) and/or obstacle material (e.g., is water, oil, soil, rock, etc.) and/or other obstacle attribute (e.g., number of attempts of removal from different digging angles), etc. If movement between locations is included as part of accomplishing a task, such classifying of obstacles may further be used as part of determining a route or path between a current location and a target destination location, such as to determine an alternative route to use if one or more obstacles of a sufficiently high classified type (e.g., of class 7 or higher) are present along what would otherwise be the initially determined route (e.g., a direct linear path). For example, depending on information about an obstacle (e.g., a type, distance, shape, depth, etc.), the automated operations of the EMVAOC system may determine to, as part of the autonomous operations of a first earth-moving vehicle, perform at least one of the following: (1) remove the obstacle and move in a direct path to the target destination location (e.g., if the first earth-moving vehicle has capabilities to effectuate such obstacle removal), or (2) move in an optimized path around the obstacle to the target destination location, or (3) initiate autonomous operations of a separate second earth-moving vehicle to remove the obstacle (e.g., if the first earth-moving vehicle does not have capabilities to effectuate such obstacle removal), and to then move the first earth-moving vehicle in a direct path to the target destination location, or (4) inhibit movement of the first earth-moving vehicle (e.g., to stop movement until the obstacle is gone, such as for a human or animal obstacle), or (5) initiate autonomous operations of a separate third earth-moving vehicle (e.g., of the same type as the first earth-moving vehicle) to move to the target destination location in preparation of performing a task in place of the first earth-moving vehicle, or (6) initiate a request for human intervention.

In addition, automated operations of an EMVAOC system may further include determining and implementing actions to control movement of some or all of an earth-moving vehicle (e.g., the earth-moving vehicle's arm(s) and/or attachment(s) and/or body/chassis) to move materials or perform other actions for one or more tasks on a job site or other geographical area, including to address any identified obstacles as part of doing so. For example, in some embodiments the EMVAOC system may include one or more planner modules, and at least one such planner module may be used to determine an optimal plan to complete a job having one or more tasks to be performed (e.g., in accordance with other goals or planning operations being performed by the EMVAOC system or a related system, such as based on an overall analysis of a site and/or as part of accomplishing a group of multiple activities at the site). In addition, the autonomous operations of the earth-moving vehicle to perform one or more tasks may be initiated in various manners, such as by an operator module of the EMVAOC system that acts in coordination with the one or more planner modules (e.g., based on a planner module providing instructions to the operator module about current work to be performed, such as work for a current day that involves the earth-moving vehicle moving designated dirt or other materials, leaving a diggable area and moving to a new area to dig, etc.), or directly by a planner module. In other embodiments, determination of target task(s) to perform and initiation of corresponding earth-moving vehicle activities may be performed in other manners, such as in part or in whole based on input from one or more human users or other sources.

In at least some embodiments, the EMVAOC system may include one or more behavioral models used to determine the specific movements and/or other actions of some or all of an earth-moving vehicle of a given type to accomplish a task (e.g., multiple behavioral models each associated with a type of task and/or type of earth-moving vehicle and/or a particular earth-moving vehicle), and automated operations of the EMVAOC system may include training the behavioral models(s) using data from operations of the earth-moving vehicle or of earth-moving vehicles of the given type (e.g., actual operational data and/or simulated operational data) and later using the trained behavioral model(s) to determine how to implement a particular task in a particular set of circumstances (e.g., starting conditions). In addition, a behavioral model may have various forms in various embodiments, including in some embodiments to be implemented as a multi-layer actor model and/or to use a multi-layer neural network, such as a neural network having some or all of the following layers: an input sequential layer with one or more nodes that receive packed input data that represents some or all of one or more episodes of actual and/or simulated operational data (e.g., packed input data for one or more sliding windows, representing states of initial conditions for the earth-moving vehicle and surrounding environment) and that extract packed data (e.g., to capture underlying time structures), with outputs being generated logits (e.g., unnormalized outputs or predictions); one or more first hidden neural network layers with one or more nodes to represent the state inputs and that receive the logits of the sequential neural network layer as inputs and that generate additional logits as outputs; a concatenation layer with one or more nodes that receive and merge the hidden layer logits with the sequential layer logits and outputs merged logits; one or more second hidden neural network layers with multiple nodes that receive and further process the output logits of the concatenation layer and generate a combination of states and logits as outputs; an output layer with multiple nodes to convert outputs of the second hidden layer(s) to actions (e.g., activation functions) to be performed by the earth-moving vehicle; etc. In some embodiments, each behavioral model may be trained (e.g., using behavioral cloning techniques) to implement a task using a combination of actual data from actual human operation of an earth-moving vehicle to perform the task (e.g., multiple episodes each having data about the manipulation of the manual controls of the earth-moving vehicle to perform an instance of the task) and simulated data of operating an earth-moving vehicle to perform the task (e.g., multiple simulated episodes using variations in starting conditions and/or control manipulations and each having data about manipulations of the earth-moving vehicle's controls to perform an instance of the task), such as by using positive and/or negative training examples. It will be appreciated that other behavioral model structures and/or training activities may be performed in other embodiments and situations. In at least some embodiments, the use of a combination of actual and simulated operational data (e.g., very large scale simulated data, such as for hundreds or thousands or millions of episodes with varied conditions and actions, including to introduce a variety of realistic variations and to allow experimentation that exceeds that practically available from only actual data) and trained behavioral model(s) in the manners described herein allows the EMVAOC system to use the trained behavioral model(s) to perform autonomous control of the operations of one or more corresponding earth-moving vehicles in a manner that exceeds human operator capabilities, such as to operate with greater-than-human speed and/or precision and/or accuracy and/or safety. In addition, in at least some such embodiments, a transfer learning solution is used that bootstraps a behavioral model trained using simulated operational data to perform autonomous control of an actual earth-moving vehicle (e.g., to improve that trained behavioral model over time using further data obtained from the actual autonomously controlled operation of the vehicle). In addition, canonical optimal movements may be learned from the simulated and/or actual operational data, using machine learning to parametrize and adapt the data to a wide range of situations and scenarios—as one non-exclusive example, a loading trajectory on flat ground can be automatically adapted to loading on any terrain slope, for different machine types and sizes, for different brands of earth moving and mining machinery, etc. Furthermore, in some embodiments and situations, a single behavioral model may be trained and used to control autonomous operations of multiple earth-moving vehicles (e.g., multiple excavator vehicles, an excavator vehicle and one or more other non-excavator vehicles, etc.) to perform a task, while in other embodiments and situations the performance of such a task may include using a separate trained behavioral model for each type of earth-moving vehicle (or particular earth-moving vehicle) and coordinating the actions of the multiple earth-moving vehicles via other automated operations of the EMVAOC system.

In addition, while the autonomous operations of an earth-moving vehicle controlled by the EMVAOC system may in some embodiments be fully autonomous and performed without any input or intervention of any human users, in other embodiments the autonomous operations of an earth-moving vehicle controlled by the EMVAOC system may be only partially autonomous, such as to include providing information to one or more human users about the operations of the EMVAOC system and optionally receiving information from one or more such human users (whether on-site or remote from the site) that are used as part of further automated operations of the EMVAOC system (e.g., one or more target tasks, a high-level work plan, etc.)—such information providing and/or receiving may, for example, occur via one or more GUIs ("graphical user interfaces") displayed on one or more computing device that provide user-selectable controls and other options to allow a user to interactively request or specify types of information to display and/or to interactively provide information for use by the EMVAOC system, such as one or more GUIs provided by the EMVAOC system.

The described techniques provide various benefits in various embodiments, including to improve the control of autonomous operations of earth-moving vehicles (e.g., fully autonomous operations), such as based at least in part on data gathered by on-vehicle perception systems about an environment around the vehicles (e.g., a job site) and on using such gathered and additional determined environment data in one or more beneficial manners (e.g., to detect obstacles and other objects). In addition, by positioning a LiDAR component and/or other sensors on a movable component part of a vehicle (e.g., a hydraulic arm, a tool attachment, etc.), the EMVAOC system may further direct automated movement of the component part (e.g., independently from or in conjunction with movement of the vehicle chassis or body) to gather additional environment data that may not be otherwise available (e.g., raise the component part to gather environment data that is otherwise blocked by the terrain or an obstacle). Furthermore, described techniques may further use such gathered and determined environment data to provide additional enhanced functionality of multiple types. Such automated techniques allow such autonomous operations to be determined more quickly and with greater accuracy than previously existing techniques, including to significantly reduce computing power and time used, and further enable additional enhanced functionality that was not previously available. In addition, in some embodiments the described techniques may be used to provide an improved GUI in which a user may more accurately and quickly obtain information about operations of earth-moving vehicles and optionally provide corresponding input, such as in response to search requests or other instructions, as part of providing personalized information to the user, etc. Various other benefits are also provided by the described techniques, some of which are further described elsewhere herein.

FIGS. 2A-2I illustrate examples of earth-moving vehicles and types of on-vehicle data sensors positioned to support autonomous operations on a site.

Figure 2A:
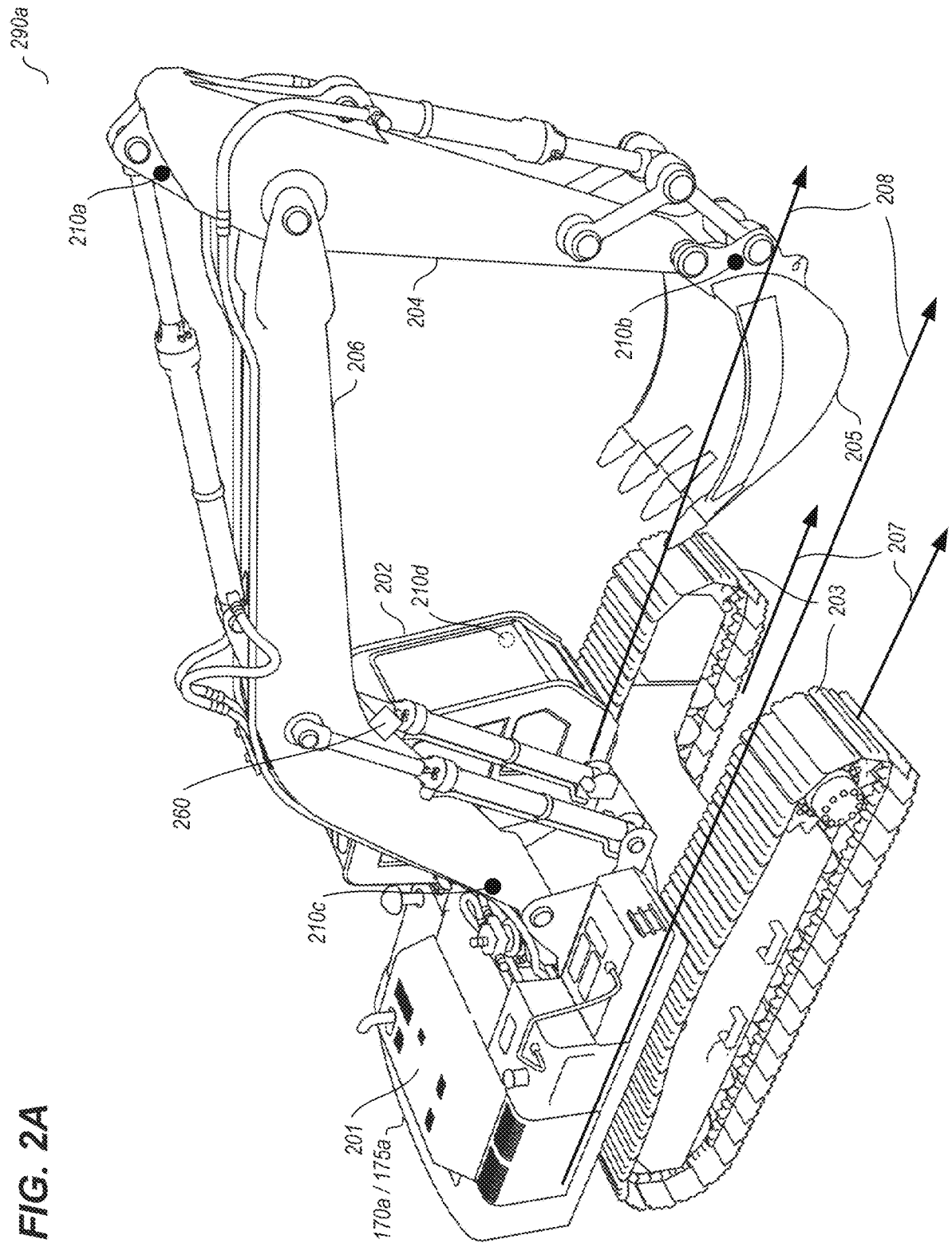

In particular, with respect to FIG. 2A, information 290a about an example earth-moving construction vehicle 170a and/or mining vehicle 175a is illustrated, which in this example is a tracked excavator vehicle, using an upper-side-frontal view from the side of the digging boom arm 206 and stick arm (or 'stick') 204 and opposite the side of the cabin 202, with the earth-moving vehicle 170a/175a further having a main body chassis 201 (e.g., enclosing an engine and counterweight, and including the cabin 202), tracks 203 and bucket (or 'scoop' or 'claw') tool attachment 205—in other embodiments, tool attachments other than a bucket may be used such as, for example, a hydraulic thumb, coupler, breaker, compactor, digging bucket, grading bucket, hammer, demolition grapple, tiltrotator, etc. Four example inclinometers 210 are further illustrated at positions that beneficially provide inclinometer data to compute the position of the bucket and other parts of the digging arms relative to the position of the cabin of the earth-moving vehicle. In this example, three inclinometers 210a-210c are mounted at respective positions on the digging arms of the earth-moving vehicle (position 210c near the intersection of the digging boom arm and the body of the earth-moving vehicle, position 210b near the intersection of the digging stick arm and the bucket attachment, and position 210a near the intersection of the digging boom and stick arms), such as to use single-axis inclinometers in this example, and with a fourth inclinometer 210d mounted within the cabin of the earth-moving vehicle and illustrated at an approximate position using a dashed line, such as to use a dual-axis inclinometer that measures pitch and roll—data from the inclinometers may be used, for example, to track the position of the earth-moving vehicle arms/attachment, including when a track heading direction 207 is determined to be different (not shown in this example) from a cabin/body heading direction 208. The inclinometer 210d may, for example, be near a self-contained control unit located in the cabin, not shown in this example. This example further illustrates a position of a LiDAR component 260, which in this example is positioned on the underside of the digging boom arm 206 near its bend in the middle, and as such is movable along with the movements of the digging boom arm component 206, as well as being independently movable (e.g., to change its direction or orientation, such as by rotating, tilting, swiveling, etc.)— in other embodiments, the LiDAR component 260 may be located in other positions on the vehicle 170a/175a and/or may be one of multiple LiDAR components positioned at different locations on the vehicle. It will be appreciated that other quantities, positionings and types of illustrated sensors/components may be used in other embodiments.

Figure 2B:
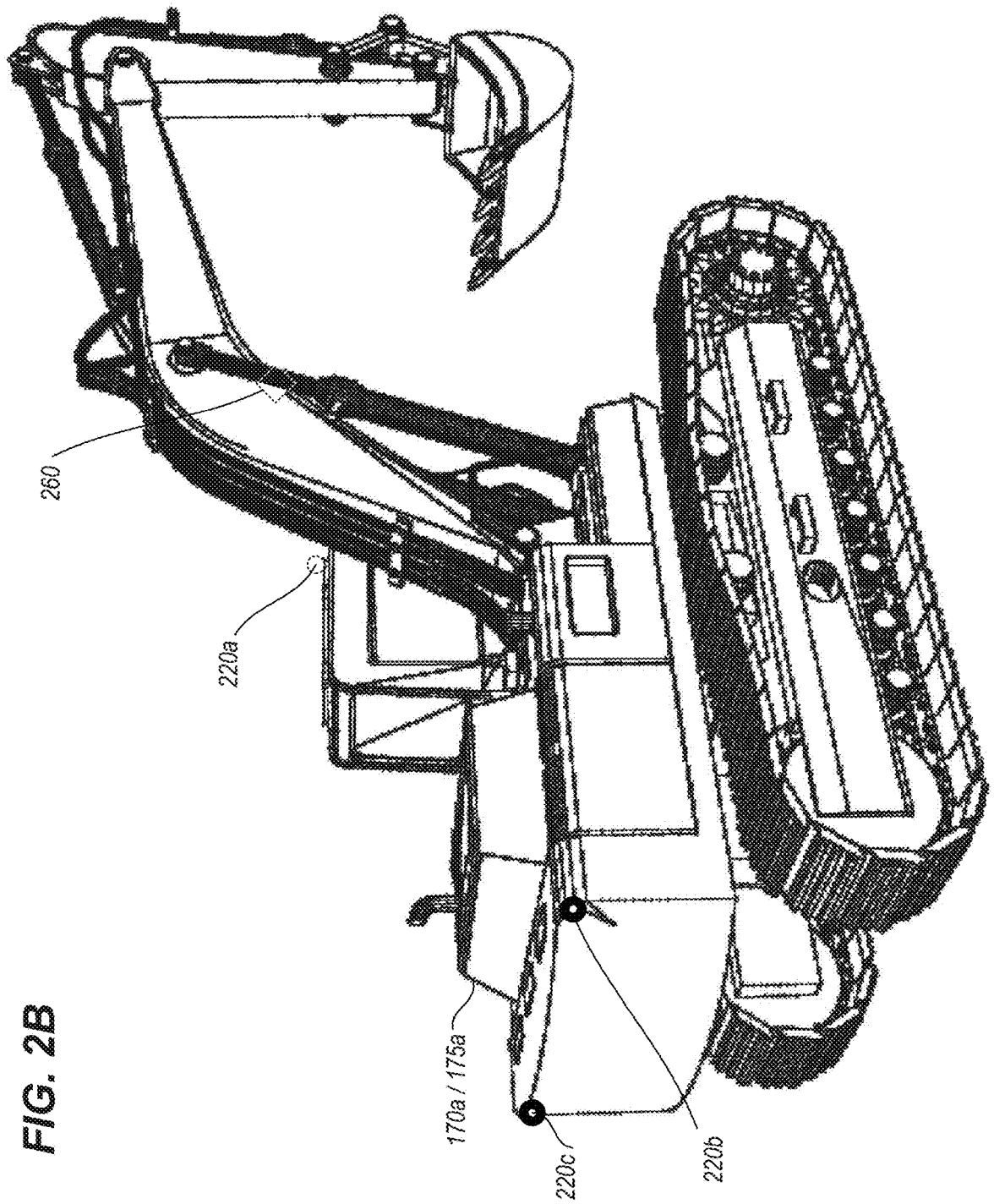
Figure 2C:
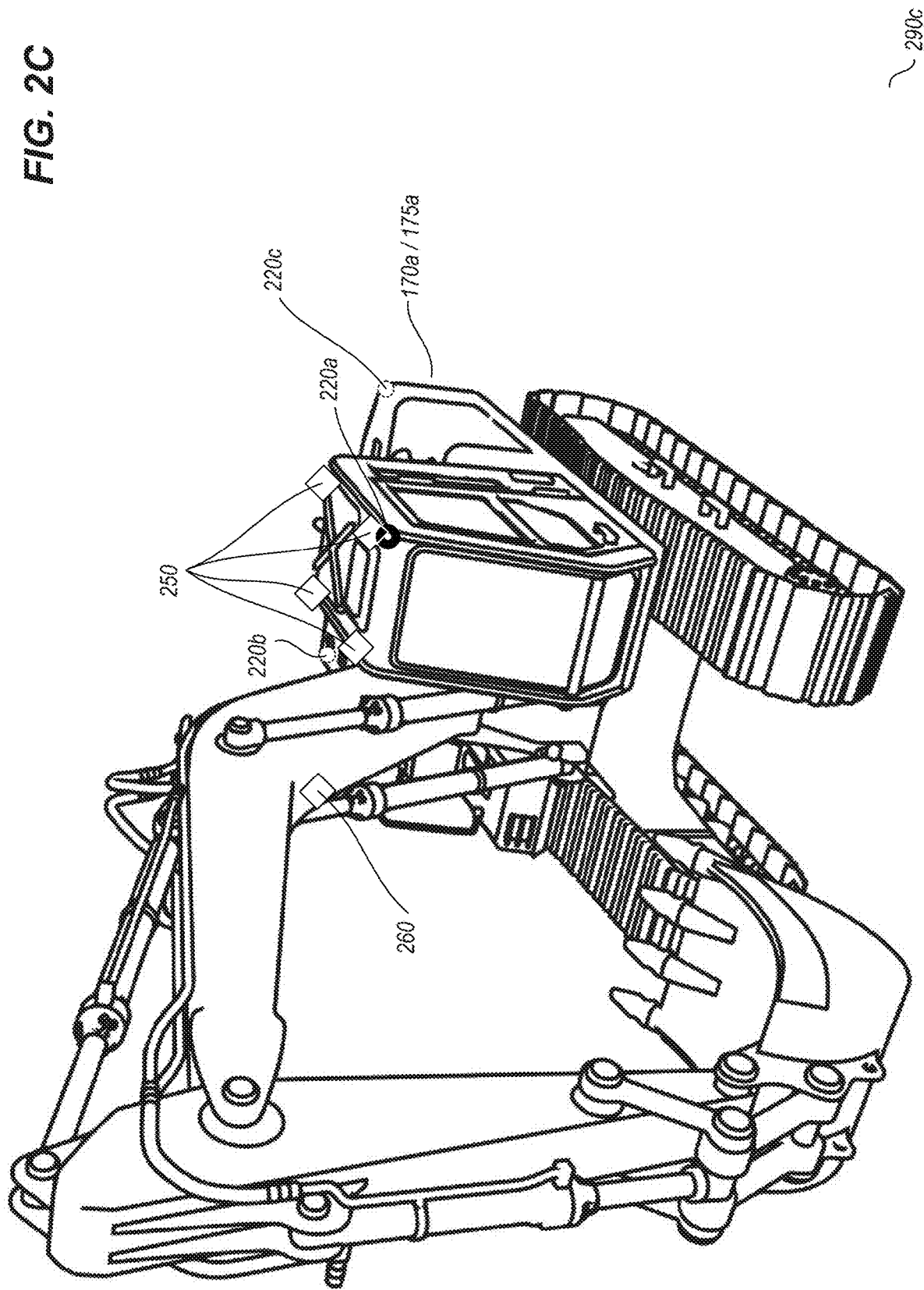

FIGS. 2B and 2C continue the example of FIG. 2A, and illustrate information 290b and 290c, respectively, about three example GPS antennas 220 at positions that beneficially provide GPS data to assist in determining the positioning and direction of the chassis (e.g., cabin and body) of the earth-moving vehicle 170a/175a, including to use data from the three GPS antennas to provide greater precision than is available from a single GPS antenna. In this example, the three GPS antennas 220a-220c are positioned on the earth-moving vehicle body chassis and proximate to three corners of the chassis (e.g., as far apart from each other as possible), such that differential information between GPS antennas 220a and 220c may provide cabin heading direction information, and differential information between GPS antennas 220b and 220c may provide lateral direction information at approximately 90° from that cabin heading direction information. In particular, in FIG. 2B, the example earth-moving vehicle is shown using a side-rear view from the side of the arms, with GPS antennas 220b and 220c illustrated on the back of the body chassis at or below the top of that portion of the body chassis, and with an approximate position of GPS antenna 220a on the cabin top near the front illustrated with dashed lines (e.g., as illustrated further in FIG. 2C). In FIG. 2C, the example earth-moving vehicle is shown using an upper-side-frontal view from the side of the cabin, with GPS antenna 220a shown on the cabin top near the front on the same side as GPS antenna 220c, and with the positions of GPS antennas 220b and 220c illustrated through the body chassis with dashed lines (e.g., just below the top of the back of the body chassis, as illustrated in FIG. 2B). While not illustrated in FIGS. 2B-2C, some or all of the GPS antennas may be enabled to receive and use RTK data to further improve the accuracy of the GPS signals that are produced, such as by each being part of or otherwise associated with a GPS receiver including an RTK radio that receives and uses RTK-based GPS correction data transmitted from a base station (e.g., at a location remote from the site at which the earth-moving vehicle is located) to improve accuracy of the GPS signals from the GPS antennas, so as to be part of one or more RTK-enabled GPS positioning units. The LiDAR component 260 is also illustrated, using dashed lines in FIG. 2B to indicate its location on the underside of the digging boom arm due to the boom arm blocking a direct view of the component 260, and being directly visible in FIG. 2C. FIG. 2C also illustrates possible locations of one or more RGB cameras 250 that gather additional visual data about an environment of the vehicle 170a/175a— in this example, four cameras are used on top of the cabin (e.g., to in the aggregate provide visual coverage of some or all of 360° horizontally), with two on each side, and optionally with the two front camera facing partially or fully forwards and the two back cameras facing partially or fully backwards, although in other embodiments other camera configurations and/or types may be used (e.g., one or more cameras with panoramic view angles, such as to each cover some or all of 360° horizontally). It will be appreciated that other quantities, positionings and types of GPS antennas (and/or antennas for other types of satellite-based navigation systems) and/or other sensors/components may be used in other embodiments.

Figure 2D:
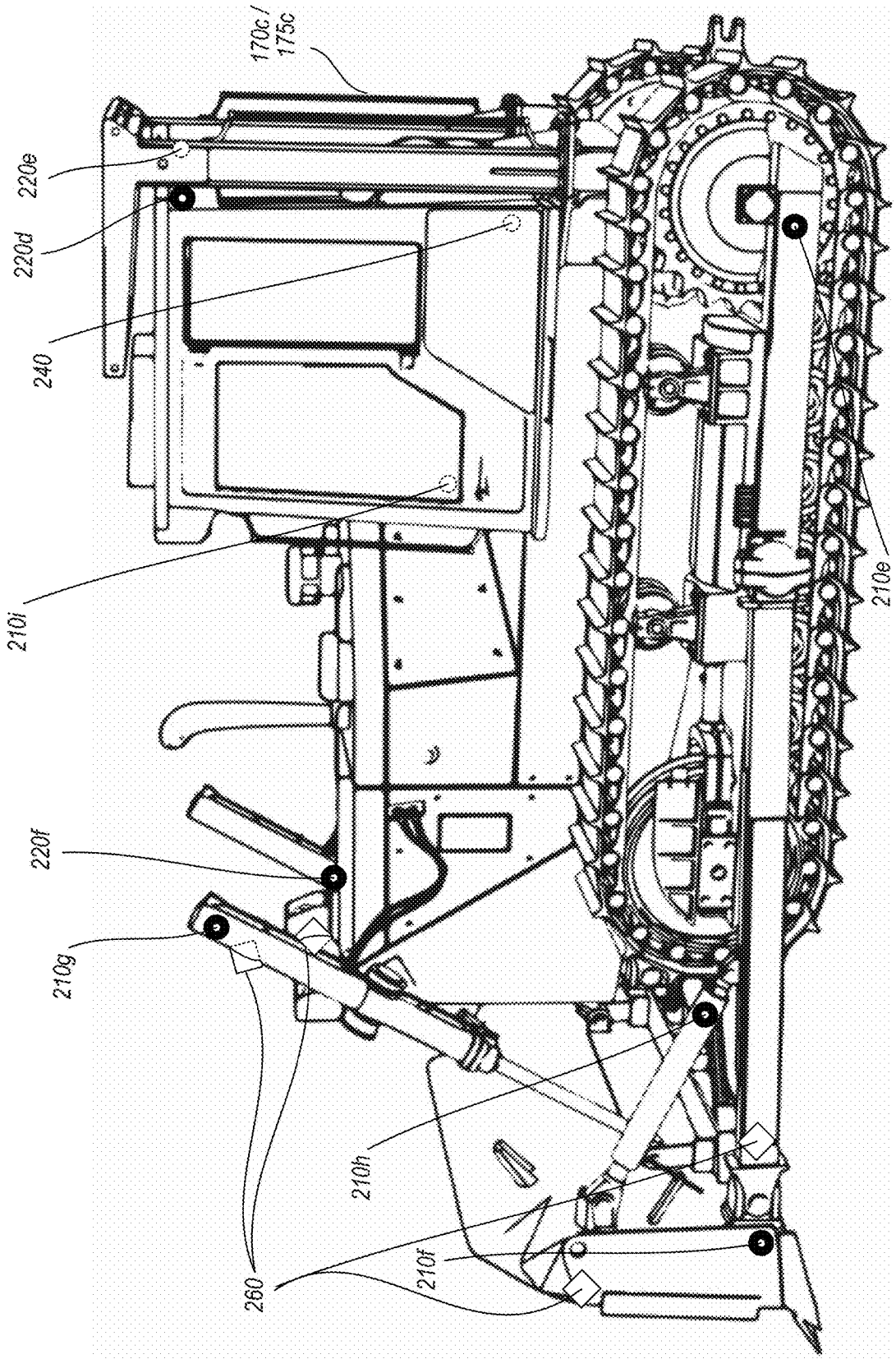
Figure 2E:
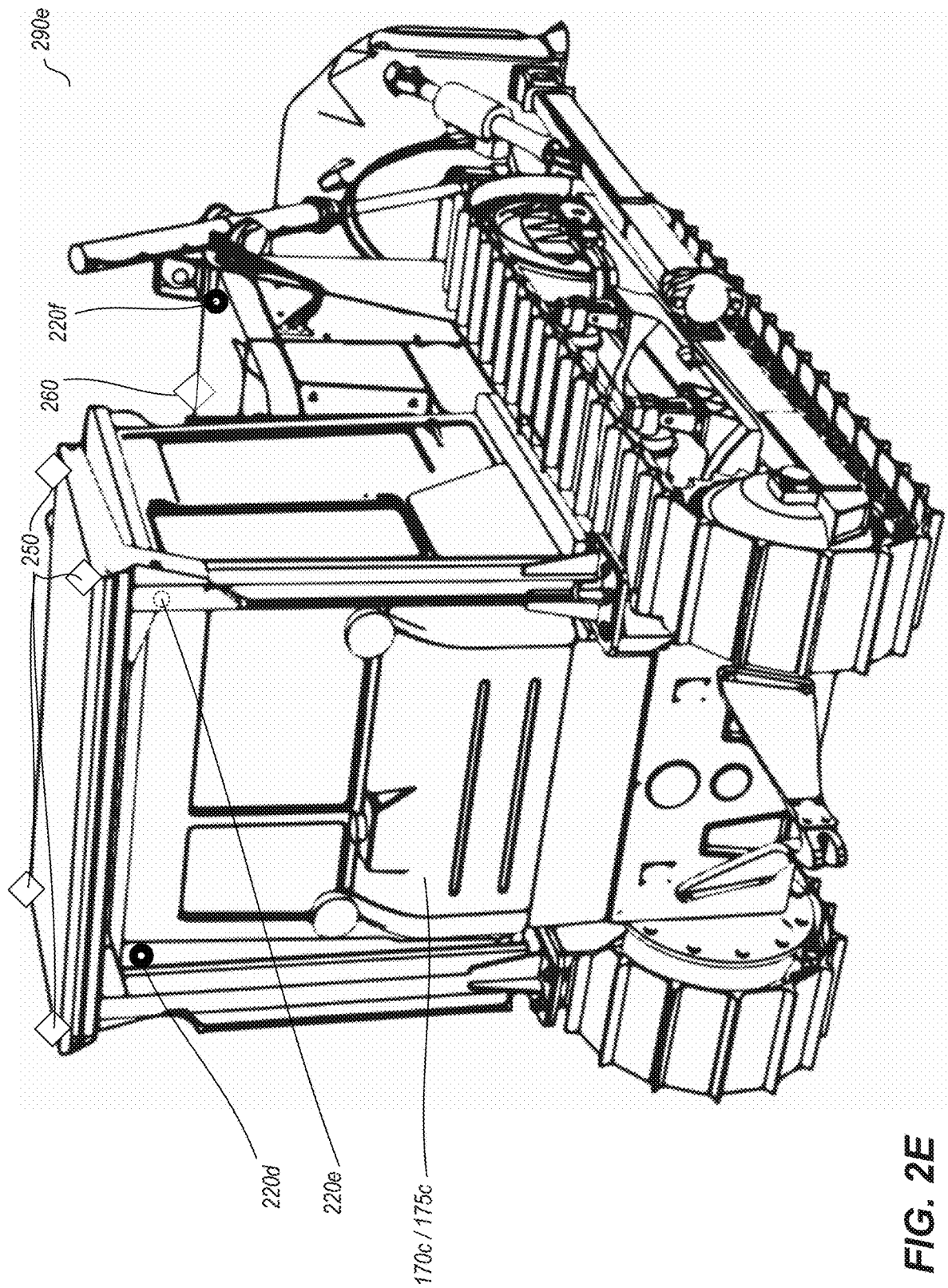

FIGS. 2D-2I continue the examples of FIGS. 2A-2C, with FIGS. 2D and 2E illustrating information 290d and 290e, respectively, about another earth-moving construction vehicle 170c and/or mining vehicle 175c, which in this example is a bulldozer vehicle, such as to illustrate example positions for GPS receivers 220 and/or inclinometers 210 and/or one or more LiDAR components 260. In particular, FIG. 2D illustrates example information 290d that includes various example inclinometers 210e-210i, example GPS antennas/receivers 220d-220f, and possible locations for one or more LiDAR components 260. The example inclinometers 210e-210i are illustrated at positions that beneficially provide inclinometer data to compute the location of the blade or other front attachment (and optionally other parts of the bulldozer, such as the hydraulic arms) relative to the cabin of the bulldozer vehicle (e.g., at position 210e near the intersection of the track spring lifting arm and the body of the vehicle, position 210f near the intersection of the track spring lifting arm and the blade or other attachment, position 210g at one end of a hydraulic arm, position 210h at one end of the tilt cylinder, etc.), such as to use single-axis inclinometers in this example, and with another inclinometer 210i mounted within the cabin of the vehicle and illustrated at an approximate position using a dashed line, such as to use a dual-axis inclinometer that measures pitch and roll—data from the inclinometers may be used, for example, to track the position of the track spring lifting arm and attachment relative to the cabin/body of the vehicle. The example GPS antennas/receivers 220 are illustrated at positions that beneficially provide GPS data to assist in determining the positioning and direction of the cabin/body, including to use data from the three GPS antennas to provide greater precision than is available from a single GPS antenna. In this example, the three GPS antennas 220d-220f are positioned on the body chassis and proximate to three corners of the chassis (e.g., as far apart from each other as possible), such that differential information between GPS antennas 220f and 220e may provide cabin heading direction information, and differential information between GPS antennas 220d and 220e may provide lateral direction information at approximately 90° from that cabin heading direction information. The example one or more LiDAR components 260 are illustrated at one or more possible positions that beneficially provide LiDAR data about some or all of an environment around the vehicle 170c/175c, such as to be positioned on one or more sides of the blade/scoop attachment (e.g., to have a view to the side(s) of the vehicle) and/or a top or bottom (not shown) of the blade/scoop attachment (e.g., to have a view forwards), and/or on sides and/or front of one or more of the hydraulic arms (e.g., to have a view to the side(s) and/or front of the vehicle), and/or on a front of the chassis (e.g., near the top to have a view forwards over the blade/scoop attachment), etc. FIG. 2E also illustrates possible locations of one or more RGB cameras 250 that gather additional visual data about an environment of the vehicle 170c/175c— in this example, four cameras are used on top of the cabin (e.g., to in the aggregate provide visual coverage of some or all of 360° horizontally), with two on each side, and optionally with the two front camera facing partially or fully forwards and the two back cameras facing partially or fully backwards, although in other embodiments other camera configurations and/or types may be used (e.g., one or more cameras with panoramic view angles, such as to each cover some or all of 360° horizontally). In particular, in FIG. 2D, the example earth-moving vehicle is shown using a side view, with GPS antennas 220d and 220e illustrated on the back of the body chassis at or below the top of that portion of the body chassis (using dashed lines to illustrate position 220e), and with an approximate position of GPS antenna 220f on the chassis top near the front—the positions 220d-220f are further illustrated in information 290g of FIG. 2E, in which the example earth-moving vehicle is shown using an upper-side-back view, with GPS antenna 220f shown on the body top near the front on the same side as GPS antenna 220e. While not illustrated in FIGS. 2D-2E, some or all of the GPS antennas may be enabled to receive and use RTK data to further improve the accuracy of the GPS signals that are produced, such as by each being part of or otherwise associated with a GPS receiver including an RTK radio that receives and uses RTK-based GPS correction data transmitted from a base station (e.g., at a location remote from the site at which the vehicle is located) to improve accuracy of the GPS signals from the GPS antennas, so as to be part of one or more RTK-enabled GPS positioning units. It will be appreciated that other quantities, positionings and types of GPS antennas (and/or antennas for other types of satellite-based navigation systems) and/or inclinometers and/or other sensors/components may be used in other embodiments.

Figure 2F:
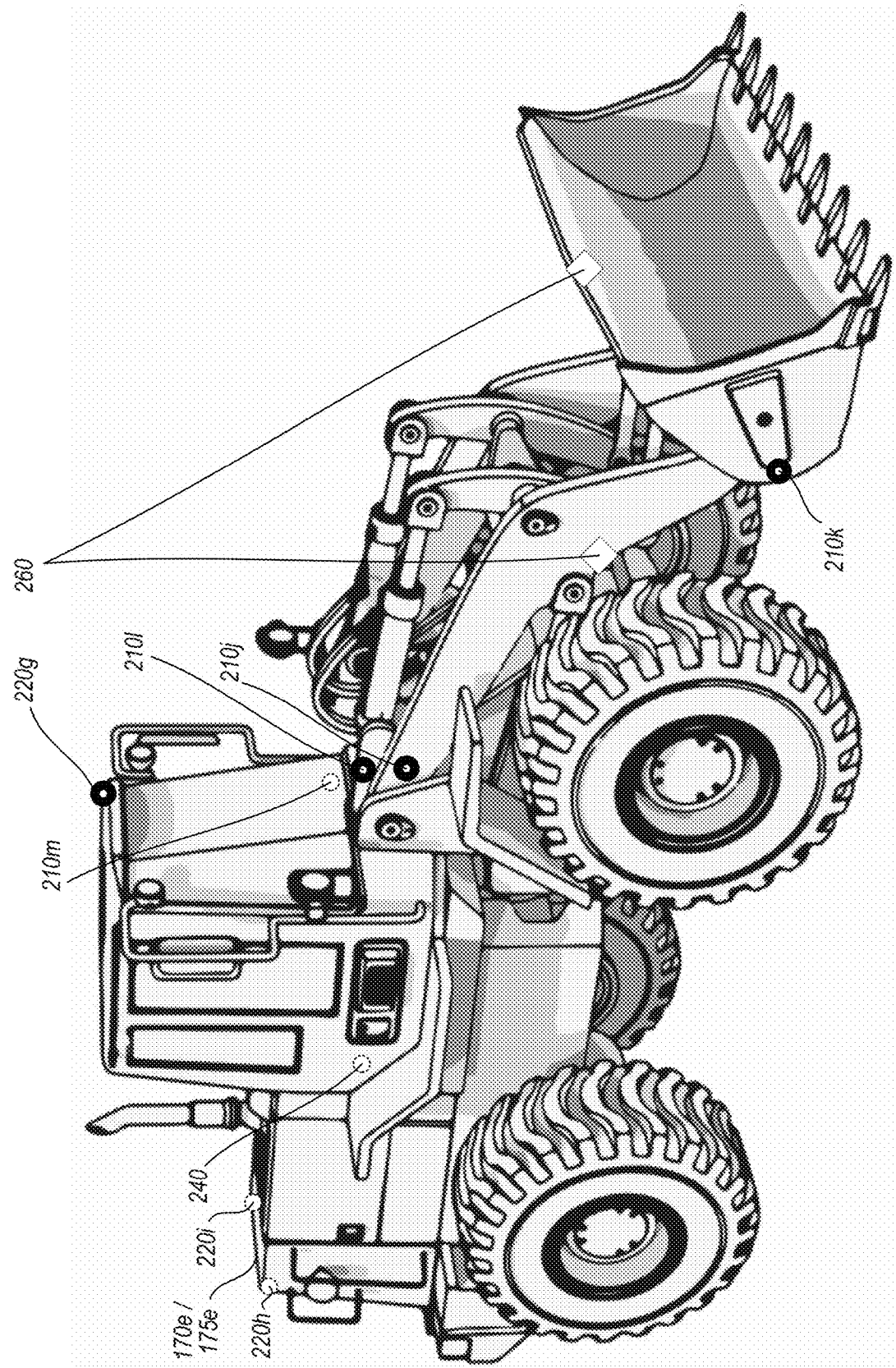
Figure 2G:
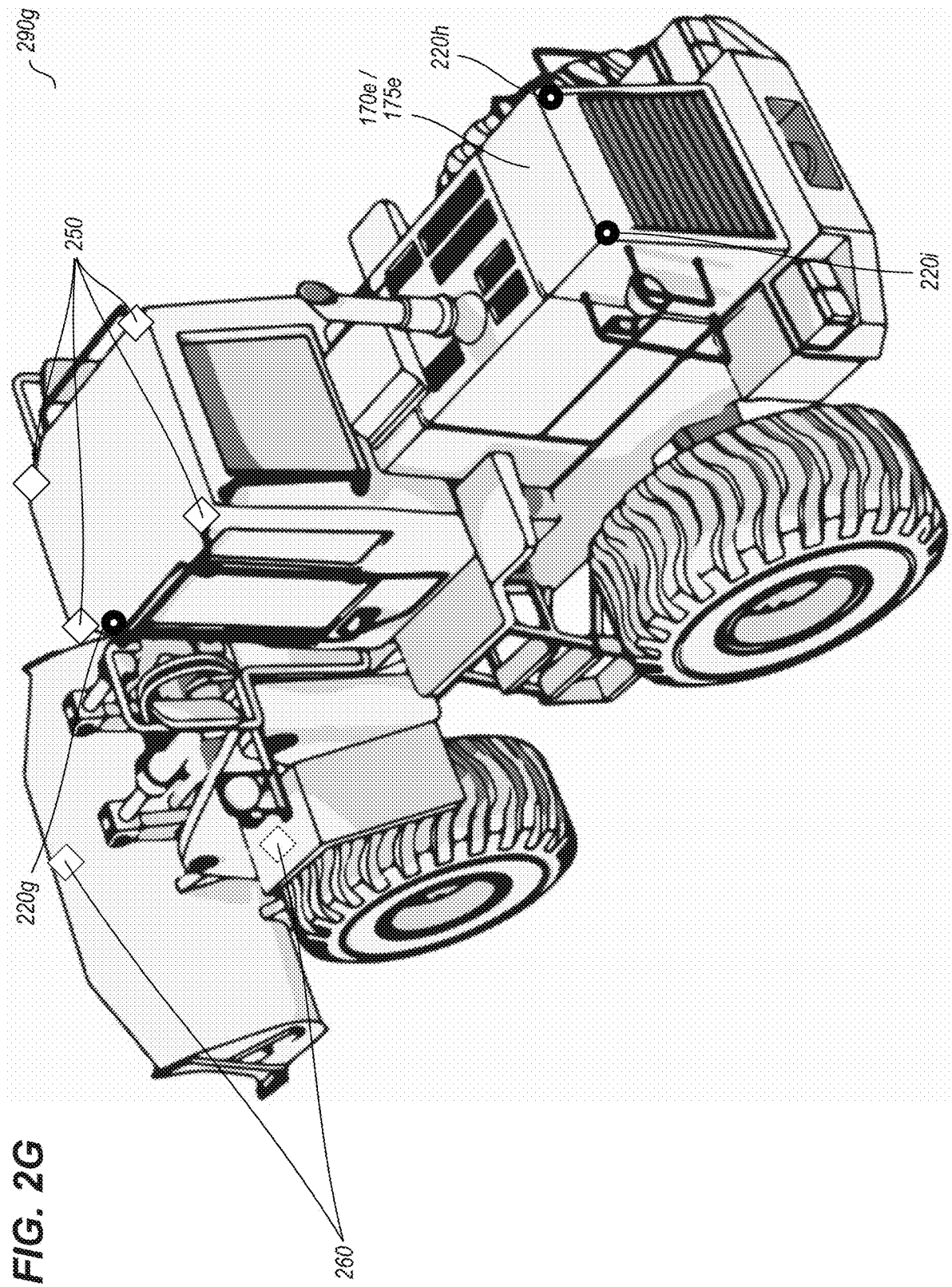

FIGS. 2F and 2G illustrate further example details about another earth-moving construction vehicle 170e and/or mining vehicle 175e, which in this example is a wheel loader vehicle, such as to illustrate example positions for GPS receivers 220 and/or inclinometers 210 and/or one or more LiDAR components 260. In particular, FIG. 2F illustrates example information 290f that includes various example inclinometers 210j-210m, example GPS antennas/receivers 220g-220i, and example LiDAR components 260. The example inclinometers 210j-210m are further illustrated at positions that beneficially provide inclinometer data to compute the location of the bucket or other front attachment (and optionally other parts of the wheel loader, such as the hydraulic arms) relative to the cabin of the loader vehicle (e.g., at position 210j near the intersection of the boom lifting arm and the body of the vehicle, position 210k near the intersection of the boom lifting arm and the bucket or other attachment, position 210l at one end of a hydraulic arm, etc.), such as to use single-axis inclinometers in this example, and with another inclinometer 210m mounted within the cabin of the vehicle and illustrated at an approximate position using a dashed line, such as to use a dual-axis inclinometer that measures pitch and roll—data from the inclinometers may be used, for example, to track the position of the boom lifting arm and attachment relative to the cabin/body of the vehicle. The example GPS antennas/receivers 220 are further illustrated at positions that beneficially provide GPS data to assist in determining the positioning and direction of the cabin/body, including to use data from the three GPS antennas to provide greater precision than is available from a single GPS antenna. In this example, the three GPS antennas 220g-220i are positioned on the body chassis and proximate to three corners of the chassis (e.g., as far apart from each other as possible), such that differential information between GPS antennas 220g and 220i may provide cabin heading direction information, and differential information between GPS antennas 220h and 220i may provide lateral direction information at approximately 90° from that cabin heading direction information. The example one or more LiDAR components 260 are illustrated at one or more possible positions that beneficially provide LiDAR data about some or all of an environment around the vehicle 170e/175e, such as to be positioned in this example on the underside of one or more of the hydraulic arms in a manner similar to that of excavator vehicle 170a/175a (e.g., to have a view to the side(s) and/or front of the vehicle 170e/175e) and/or on the top of the tool attachment (e.g., to have a view to the side(s) and/or front of the vehicle 170e/175e), and using dashed lines in FIGS. 2F and 2G due to their location being blocked by other parts of the vehicle 170e/175e. FIG. 2G also illustrates possible locations of one or more RGB cameras 250 that gather additional visual data about an environment of the vehicles 170e/175e— in this example, four cameras are used on top of the cabin (e.g., to in the aggregate provide visual coverage of some or all of 360° horizontally), with two on each side, and optionally with the two front camera facing partially or fully forwards and the two back cameras facing partially or fully backwards, although in other embodiments other camera configurations and/or types may be used (e.g., one or more cameras with panoramic view angles, such as to each cover some or all of 360° horizontally). In particular, in FIG. 2F, the example earth-moving vehicle is shown using a side-frontal view, with GPS antennas 220h and 220i illustrated on the back of the body chassis at or below the top of that portion of the body chassis (using dashed lines to illustrate their positions), and with an approximate position of GPS antenna 220g on the chassis top near the front—the positions 220g-220i are further illustrated in information 290i of FIG. 2G, which is shown using an upper-side-back view, with GPS antenna 220g shown on the body top near the front on the same side as GPS antenna 220i. While not illustrated in FIGS. 2F and 2G, some or all of the GPS antennas may be enabled to receive and use RTK data to further improve the accuracy of the GPS signals that are produced, such as by each being part of or otherwise associated with a GPS receiver including an RTK radio that receives and uses RTK-based GPS correction data transmitted from a base station (e.g., at a location remote from the site at which the vehicle is located) to improve accuracy of the GPS signals from the GPS antennas, so as to be part of one or more RTK-enabled GPS positioning units. It will be appreciated that other quantities, positionings and types of GPS antennas (and/or antennas for other types of satellite-based navigation systems) and/or inclinometers and/or other sensors/components may be used in other embodiments.

Figure 2I:
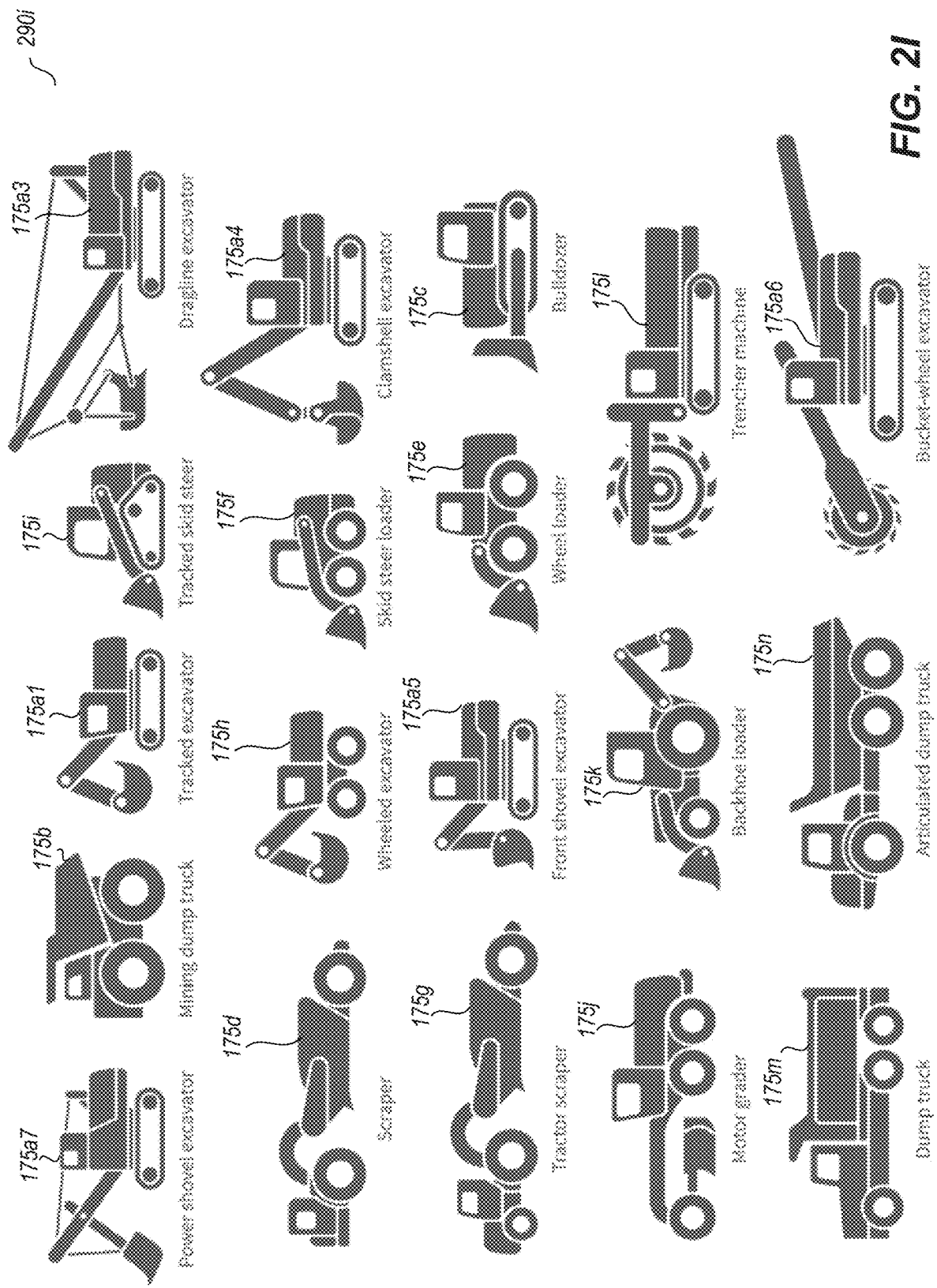
Figure 2J:
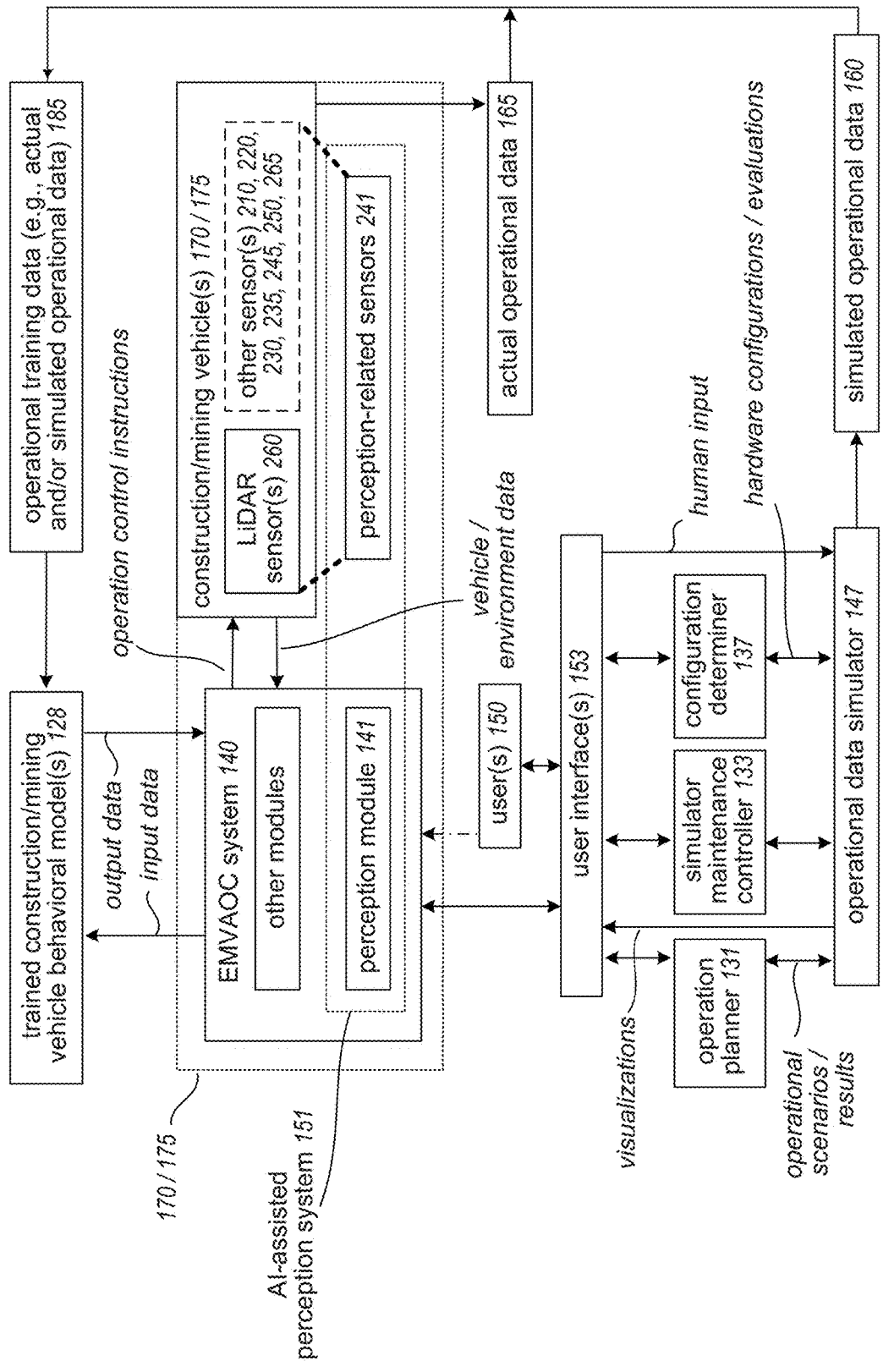

FIGS. 2H and 2I continue the examples of FIGS. 2A-2G, and illustrate a variety of non-exclusive example types of earth-moving construction vehicles 170 and types of earth-moving mining vehicles 175 that may be controlled by embodiments of the EMVAOC system. In particular, FIG. 2H includes information 290h that illustrates earth-moving construction vehicles 170, including two example earth-moving tracked construction excavator vehicles 170a shown with different attachments (excavator vehicle 170a1 with a bucket attachment, and excavator vehicle 170a2 with a grapple attachment) that may be controlled by the EMVAOC system. Other example types of earth-moving construction vehicles 170 that are illustrated include a bulldozer 170c; a backhoe loader 170d; a wheel loader 170e; a skid steer loader 170f; a dump truck 170j; a forklift 170g; a trencher 170h; a mixer truck 170i; a flatbed truck 170k; a grader 170l; a wrecking ball crane 170m; a truck crane 170n; a cherry picker 170p; a heavy hauler 170q; a scraper 170r; a pile driver 170o; a road roller 170b; etc. It will be appreciated that other types of earth-moving construction vehicles may similarly be controlled by the EMVAOC system in other embodiments. In a similar manner, FIG. 2I illustrates information 290i about a variety of non-exclusive example types of earth-moving mining vehicles 175 that may similarly be controlled by embodiments of the EMVAOC system, including several example earth-moving tracked mining excavator vehicles 175a shown with different attachments (excavator vehicle 175a1 with a bucket attachment, excavator vehicle 175a3 with a dragline attachment, excavator vehicle 175a4 with a clamshell extractor attachment, excavator vehicle 175a5 with a front shovel attachment, excavator vehicle 175a6 with a bucket wheel extractor attachment, excavator vehicle 175a7 with a power shovel attachment, etc.) that may be controlled by the EMVAOC system. Other example types of earth-moving mining vehicles 175 that are illustrated include a dump truck 175m; an articulated dump truck 175n; a mining dump truck 175b; a bulldozer 175c; a scraper 175d; a tractor scraper 175g; a wheel loader 175e; a wheeled skid steer loader 175f; a tracked skid steer loader 175i; a wheeled excavator 175h; a backhoe loader 175k; a motor grader 175j; a trencher 175l; etc. It will be appreciated that other types of earth-moving mining vehicles may similarly be controlled by the EMVAOC system in other embodiments.

FIG. 2J illustrates examples of modules and interactions and information used to implement autonomous operations of one or more earth-moving vehicles based at least in part on environment data gathered by on-vehicle perception systems. In particular, FIG. 2J illustrates information 290j about a powered earth-moving vehicle behavioral model 128 that is used by the EMVAOC system 140 to implement determined autonomous operations of one or more earth-moving vehicles 170/175, such as to supply input data to the behavioral model 128 corresponding to a current state and environment of the earth-moving vehicle(s) and about one or more tasks be performed (e.g., from a planner module or other source), and to receive corresponding output data that the module 140 uses to provide operation control instructions to the earth-moving vehicle(s), with the current environment information including a 3D representation of at least some of the environment surrounding the vehicle(s) generated by an AI-assisted perception system 151 that includes the perception module 141 of the EMVAOC system 140 and perception-related sensors 241. In this example, the earth-moving vehicle(s) 170/175 each have one or more LiDAR sensors 260 that generate data about a surrounding environment of the earth-moving vehicle(s) 170/175, such as in the form of one or more 3D point clouds (not shown), and may optionally further have one or more other sensors 210, 220, 230, 235, 245, 250 or 265, and the environment data and other data obtained by the on-vehicle sensors is provided to the EMVAOC system 140. The EMVAOC system 140 may analyze the environment data and other data from the vehicle(s) 170/175 to generate additional data (e.g., to classify types of obstacles of detected objects, to generate a terrain contour map or other visual map of some or all of the surrounding environment, etc.), such as based at least in part by perception module 141, and to determine operation control instructions to implement on the vehicle(s) 170/175— for example, the EMVAOC system 140 may produce DigMap information or other 2D representations to represent the terrain, such as for use by a planner component 131; etc. As one non-exclusive example, the operation control instructions may simulate inputs to the control panel on an earth-moving vehicle that would be used by a human operator, if one were present, and the behavioral model(s) 128 may translate the operation control instructions to implementation activities for the vehicle(s) 170/175 (e.g., hydraulic and/or electrical impulses) that are provided to the vehicle(s) 170/175—for example, a command may represent joystick deflection (e.g., for one or both of two joysticks, each with 2 axes), activation of a tool control button on one of the joysticks for controlling the tool attachment (e.g., claw, bucket, hammer, etc.), pedal position (e.g., for one or both of two pedals, analogous to car pedals but with a zero position in the middle and with the pedal able to move forward or backward), etc., such as using a number between −1 and 1. In one embodiment, the behavioral model achieves at least 17% efficiency improvement and 20x duty cycle improvement over human operators and proportional fuel efficiency can also be achieved. As is illustrated, some or all of the EMVAOC system 140 may execute on one or more of the vehicle(s) 170/175 in some embodiments and situations, and/or may execute separately from the vehicle(s) 170/175 in some embodiments and situations. FIG. 2J further illustrates additional modules that may interact with the EMVAOC system 140 and/or each other to provide additional functionality. In particular, one or more users 150 may use one or more user interface(s) 153 (e.g., a GUI displayed on a computing device or provided via a VR and/or AR and/or mixed reality system) to perform one or more interactions, such as one or more of the following: to interact with a planner component 131 that computes an optimal plan for an entire job or to otherwise specify operational scenarios and receive simulated results, such as for use in determining optimal or otherwise preferred implementation plans to use for one or more tasks and/or multi-task jobs or to otherwise enable user what-if experimentation activities; to interact with a configuration determiner component 137 that uses the simulator module(s) 147 to determine optimal or otherwise preferred hardware component configurations to use; to interact with a simulator maintenance controller 133 to implement various types of maintenance activities; to directly supply human input for use by the simulator module(s) 147 (e.g., configuration parameters, settings, etc.); to request and receive visualizations of simulated operations and/or simulated operational data; etc. The planner component 131 may, for example, be independently developed through the design of artificial intelligence, and a plurality of plans from the planner component 131 may be input to the same trained model without having to train new models. In some embodiments, the simulator module(s) 147 may further generate rendered visualizations (e.g., visualizations such as those illustrated with respect to FIG. 2K, such as by using 'unreal engine' from Epic Games). In addition, a training module (not shown) may further use operational training data 185 to generate and initially train the behavioral model(s) 128, and/or to retrain or otherwise update existing behavioral model(s) 128, such as using actual operational data generated from operation of the vehicle(s) 170/175 and/or using simulated operational data 160 generated from the operational data simulator 147.

In addition, information regarding physical movement dynamics information for an example earth-moving vehicle, such as a tracked excavator vehicle, may be used in the training and/or implementation of behavioral models 128, and/or by the operational data simulator module 147 in simulating operations of such an earth-moving vehicle. Such movement dynamics information may, for example, include 'working range' distances and angles that arm(s)/attachment(s) may move, such as for a bucket/scoop attachment on an excavator vehicle—as non-exclusive examples, an excavator vehicle may have a maximum digging depth between approximately 20-40 feet, a maximum reach at ground level between approximately 30-55 feet, a maximum cutting height between approximately 30-45 feet, a maximum loading height between approximately 15-40 feet, a minimum loading height between approximately 4-10 feet, a maximum depth cut for level bottom between approximately 15-25 feet, a maximum vertical wall digging depth between approximately 15-40 feet, etc. In at least some such embodiments, the operational data simulator module may use various movement-related equations as part of its operations, such as to include the following:

Position Derivative: $r(t)$
Integral:

$$r(t) = r_0 + \int_0^\tau v\, dt'$$

Velocity Derivative:

$$v(t) = \frac{dr}{dt}$$

Integral:

$$v(t) = v_0 + \int_0^\tau a\, dt'$$

Acceleration Derivative:

$$a(t) = \frac{dv}{dt} = \frac{d^2 r}{dt^2}$$

Integral: a(t)

$$W = \int_a^b F(x) d^X$$

Then composes to the full law of motion:

$$x(t) = x_0 + \int_0^t v(\tau) d\tau =$$

$$x_0 + \int_0^t v_0 e^{-\frac{k}{m}\tau} d\tau = x_0 - \frac{m v_0}{k}\left(e^{-\frac{k}{m}t} - 1\right) = x_0 \frac{m v_0}{k}\left(1 - e^{-\frac{k}{m}t}\right)$$

It will be appreciated that the operational data simulator module may use other equations in other embodiments, whether for earth-moving vehicles with the same or different attachments and/or for other types of earth-moving vehicles. In at least some embodiments, the operational data simulator module may, for example, simulate the effect of wet sand on the terrain. More generally, use of the operational data simulator module may perform experimentation with different alternatives (e.g., different sensors or other hardware components, component placement locations, hardware configurations, etc.) without actually placing them on physical earth-moving vehicles and/or for different environmental conditions without actually placing earth-moving vehicles in those environmental conditions, such as to evaluate the effects of the different alternatives and use that information to implement corresponding setups (e.g., to perform automated operations to determine what hardware components to install and/or where to install it, such as to determine optimal or near-optimal hardware components and/or placements; to enable user-driven operations that allow a user to plan out, define, and visualize execution of a job; etc.). Furthermore, such data from simulated operation may be used in at least some embodiments as part of training one or more behavioral machine learning models for one or more earth-moving vehicles (e.g., for one or more types of earth-moving vehicles), such as to enable generation of corresponding trained models and methodologies (e.g., at scale, and while minimizing use of physical resources) that are used for controlling autonomous operations of such earth-moving vehicles.

Figure 2K:
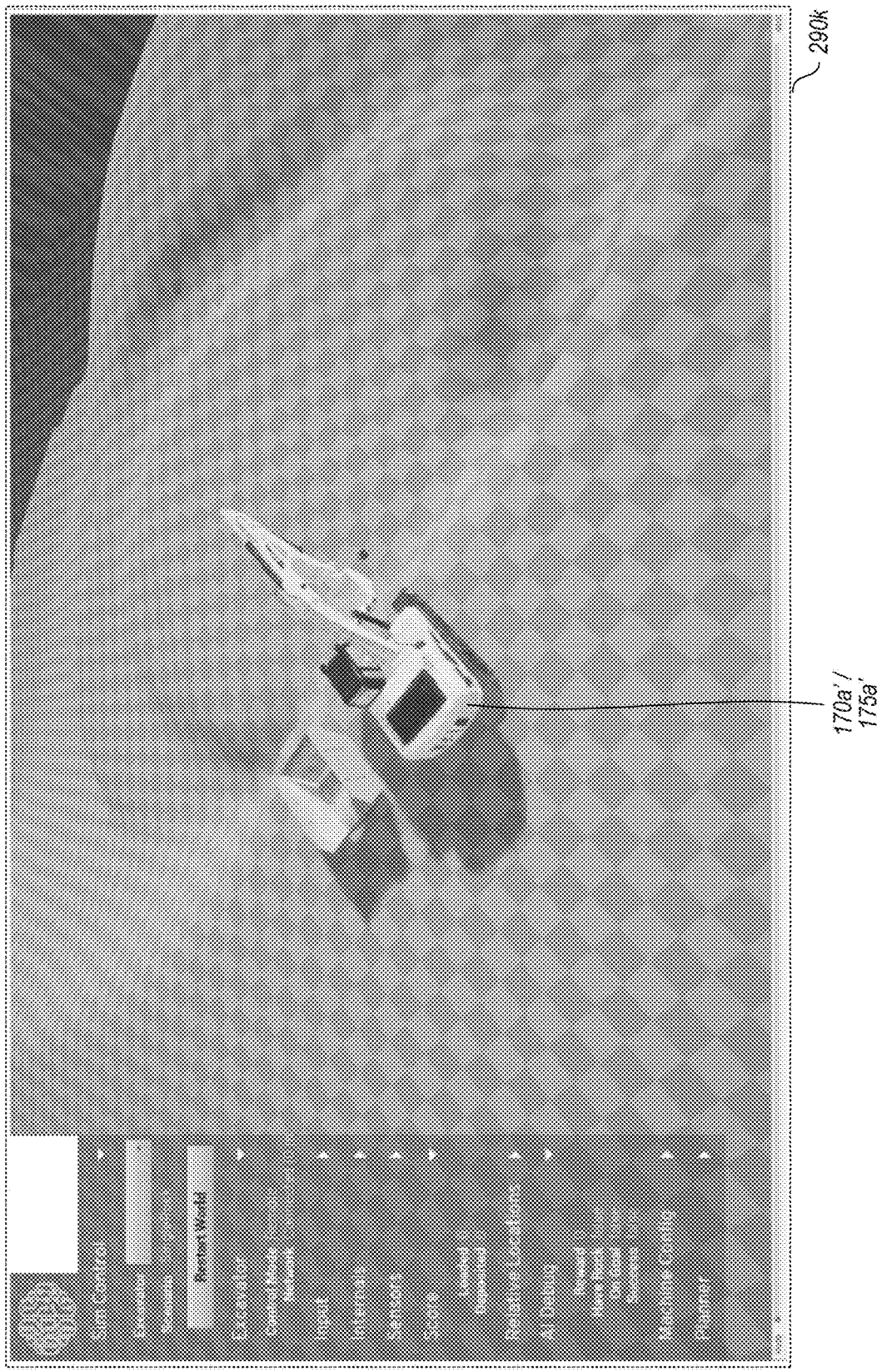
Figure 2L:
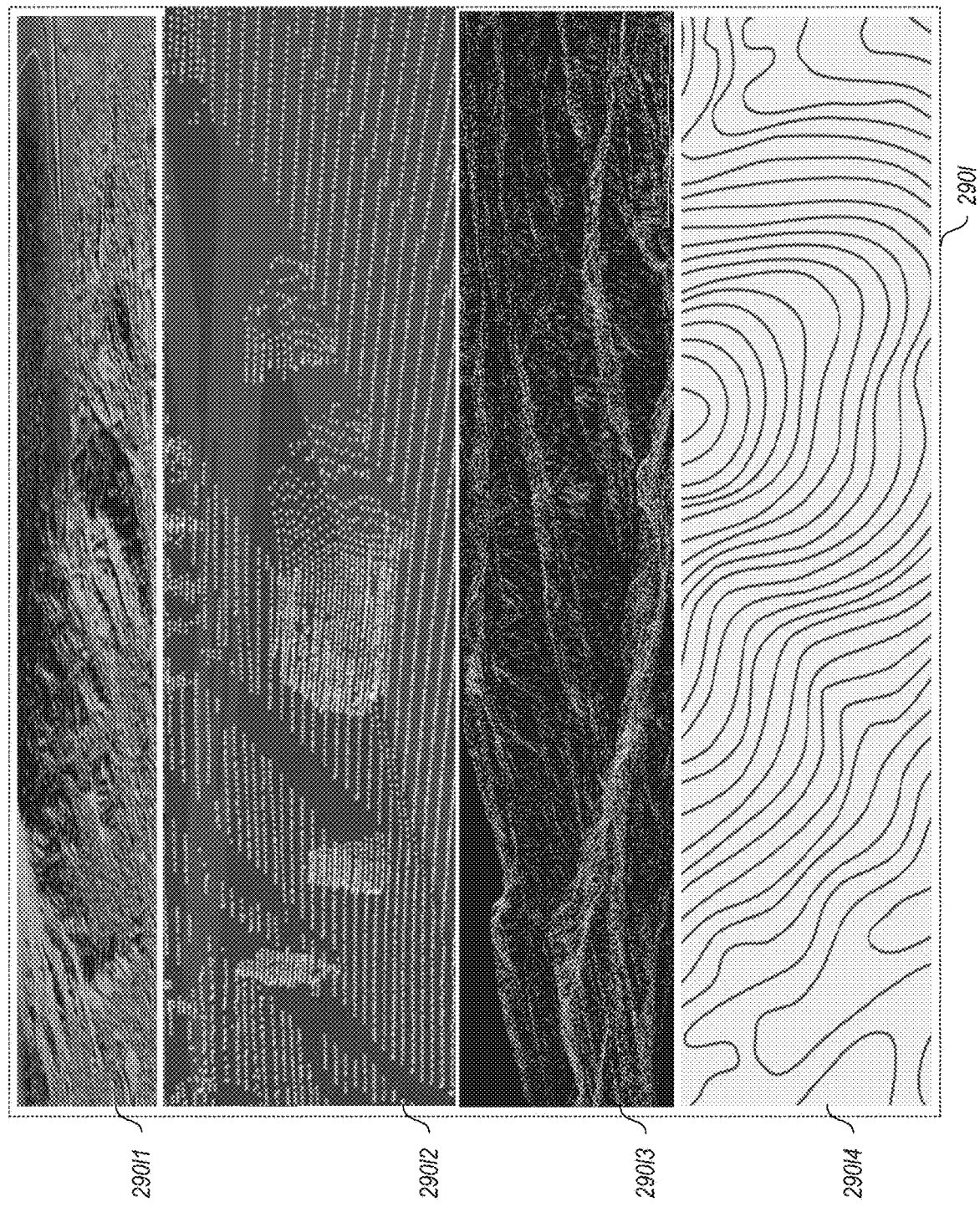

FIGS. 2L-2O illustrate further information related to the gathering and generation of environment data, such as by perception system 151. In particular, FIG. 2L illustrates information 290*l* to provide non-exclusive examples of environment data that may be gathered and generated by an embodiment of the EMVAOC system 140, such as by a perception module 141 of the system 140. In this example, information 290l1 illustrates an example of an image of surrounding terrain that may be captured around a powered earth-moving vehicle (not shown), such as by one or more RGB cameras located on the vehicle. Information 290l2 illustrates an example of information that may be gathered by one or more LiDAR modules on the vehicle regarding part of a surrounding environment, such as to include 3D data points that illustrate shape and depth information for the surrounding terrain, as well as objects in the environment (e.g., one or more vehicles, a person, a rock or other object, etc.). Information 290l3 illustrates a further example of a 3D point cloud that may be generated from LiDAR data, and shows depth and shape information for a surrounding environment. Information 290l4 illustrates one example of a visual map of a surrounding environment that may be generated from such LiDAR data, which in this example is a terrain contour visual map. In at least some embodiments, such a visual map may include a set of 3D data points, such as to each have a corresponding XYZ coordinate in relation to an origin point (e.g., absolute coordinates relative to a position on the chassis whose absolute location is determined based at least in part on GPS data and/or image data; relative coordinates based on a location of a movable LiDAR component that is used to generate the 3D data points, such as to be further adjusted based on a determined position of the LiDAR component relative to the position on the chassis in order to convert the relative coordinates to absolute coordinates; etc.).

Figure 2M:
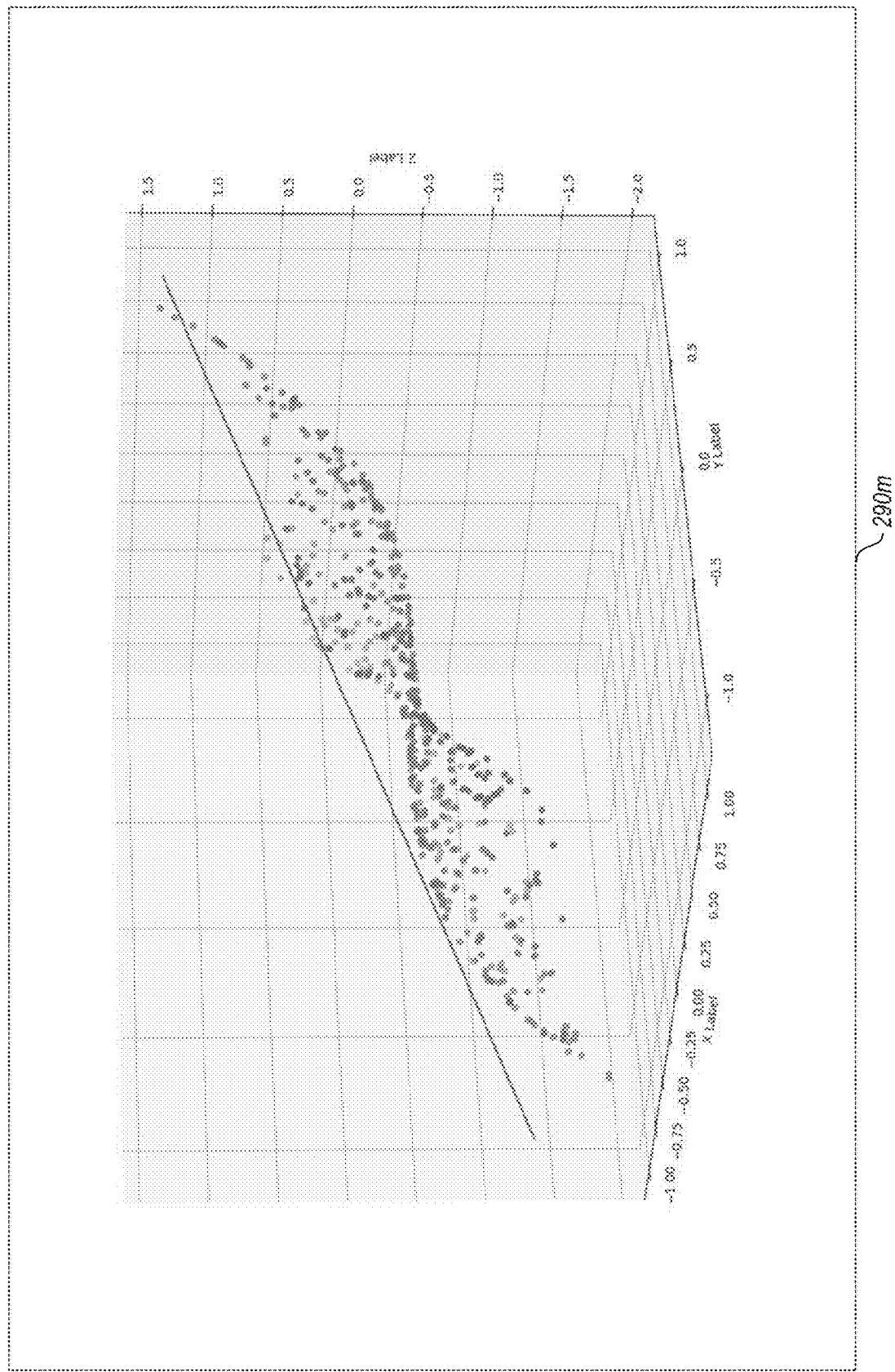
Figure 2N:
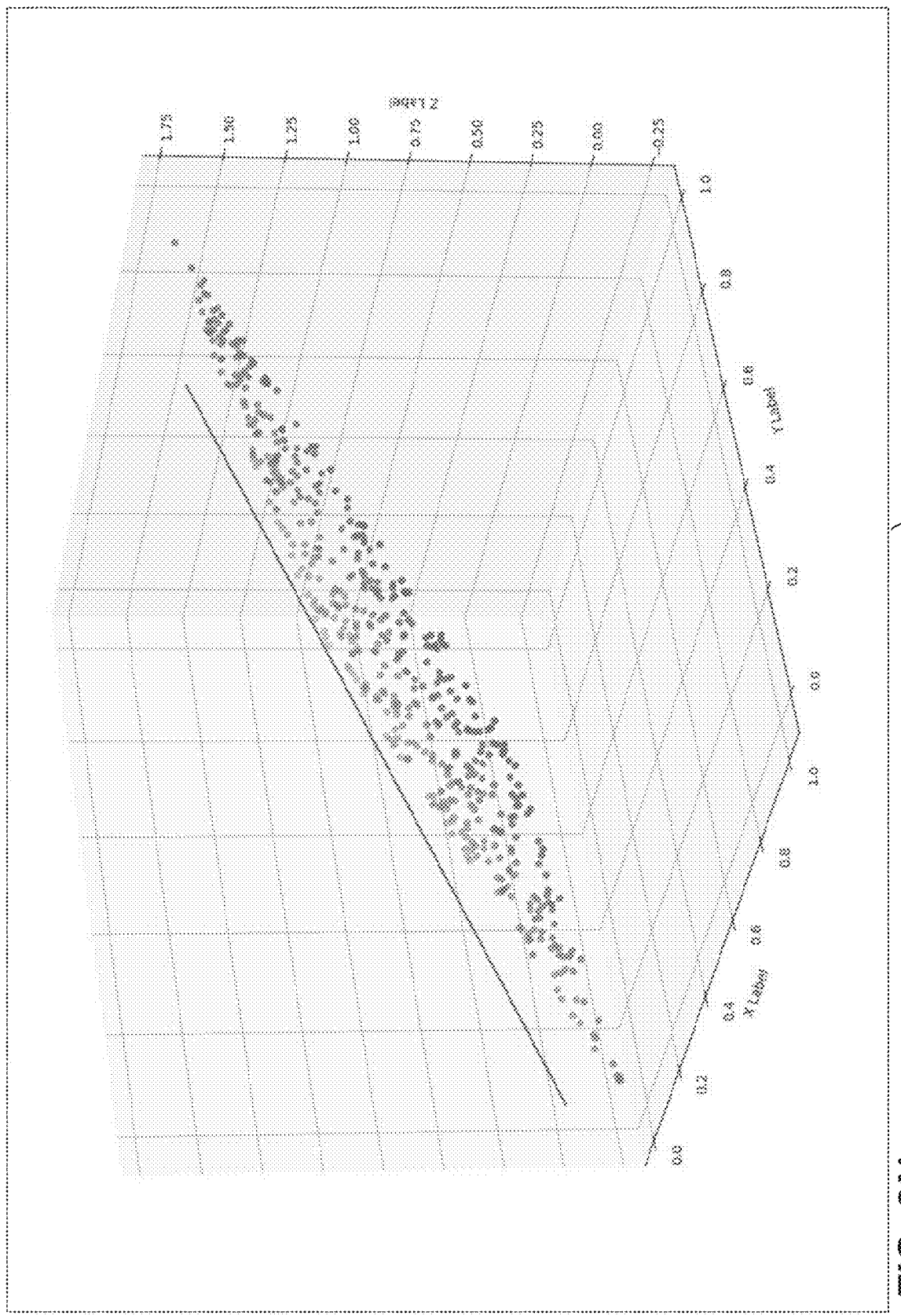

FIGS. 2M, 2N and 2O continue the examples of FIG. 2L, and illustrate non-exclusive examples of analyzing LiDAR data as part of generating a visual map of an environment surrounding a powered earth-moving vehicle. In at least some embodiments, an environment surrounding a vehicle may be divided into a number of individual cells (e.g., each having a defined size), and the 3D LiDAR data points that are located in a cell may be used to determine a slope or other shape for terrain corresponding to the area of the environment represented by that cell. For example, slope estimation may be used as part of visual map generation, and may include dividing the 3D data points into groups (e.g., the cells) based on those points' locations (e.g., their XYZ coordinates), and then calculating the principal eigenvector of all the data points in each group, indicating the direction and orientation of the portion of the terrain corresponding to those data points of the point cloud, from which a slope in three dimensions may be generated. In particular, FIG. 2M illustrates information 290*m* for such a cell, with a plurality of 3D data points shown, and a straight-line estimation for the points being calculated and shown to represent a slope of the terrain corresponding to the cell. FIG. 2N illustrates similar information 290*n* for an additional cell and straight-line estimation of its slope. FIG. 2O (also referred to herein as '2-O' for the sake of clarity) further illustrates how such calculated slope information for a plurality of cells may be combined to illustrate slope and shape information for an area of terrain in an environment of the vehicle, which in this example includes a raised portion near the center that may correspond to a raised area of dirt or other ground material, or instead an object with a rounded top that is sitting atop the ground or that extends above the surrounding ground from an underground location. As discussed in greater detail elsewhere herein, such terrain data may be further analyzed to identify and classify objects that may be obstacles for movement or other operations of the vehicle, optionally in combination with other sensor data (e.g., image data, infrared data, radar data, etc.).

FIG. 2K illustrates information 290*k* for a GUI of a simulation module that in the illustrated example is configured to repeatedly simulate operations of an earth-moving vehicle (in this example, an excavator vehicle) in performing a task (in this example, picking up a rock in a hole in front of the earth-moving vehicle and moving it to a goal location outside of the hole, such as a storage bin or other receptacle to the side of the earth-moving vehicle). The illustrated GUI includes various controls and information, such as to track the simulated activities of the earth-moving vehicle as it performs the task. The visualization of the terrain and object(s) around the illustrated excavator vehicle 170*a*'/175*a*' provides one example of a visual map that may be generated for an environment surrounding an actual powered earth-moving vehicle using environment data gathered by sensors on the vehicle.

Various details have been provided with respect to FIGS. 2A-2O, but it will be appreciated that the provided details are non-exclusive examples included for illustrative purposes, and other embodiments may be performed in other manners without some or all such details. For example, multiple types of sensors may be used to provide multiple types of data and the multiple data types may be combined and used in various ways in various embodiments, including non-exclusive examples of magnetic sensors and/or IMUs (inertial measurement units) to measure position data and whether in addition to or instead of the use of GPS and inclinometer data as discussed with respect to FIGS. 2A-2I.

Additional details about autonomous control of operations of one or more powered earth-moving vehicle are included in U.S. patent application Ser. No. 17/970,427, entitled "Autonomous Control Of On-Site Movement Of Powered Earth-Moving Construction Or Mining Vehicles" and filed Oct. 20, 2022; in U.S. patent application Ser. No. 17/893,423, entitled "Hardware Component Configuration For Autonomous Control Of Powered Earth-Moving Vehicles" and filed Aug. 23, 2022; in U.S. Patent Application No. 63/354,677, entitled "Proportional Pressure Control System For Autonomous Control Of Earth-Moving Construction And/Or Mining Vehicles" and filed Jun. 22, 2022; in U.S. Patent Application No. 63/328,469, entitled "Autonomous Control Of Operations Of Earth-Moving Vehicles Using Trained Machine Learning Models" and filed Apr. 7, 2022; in U.S. Patent Application No. 63/350,149, entitled "Autonomous Control Of Operations Of Earth-Moving Vehicles Using Data From Simulated Vehicle Operation" and filed Jun. 8, 2022; each of which is hereby incorporated by reference in its entirety.

Figure 3:
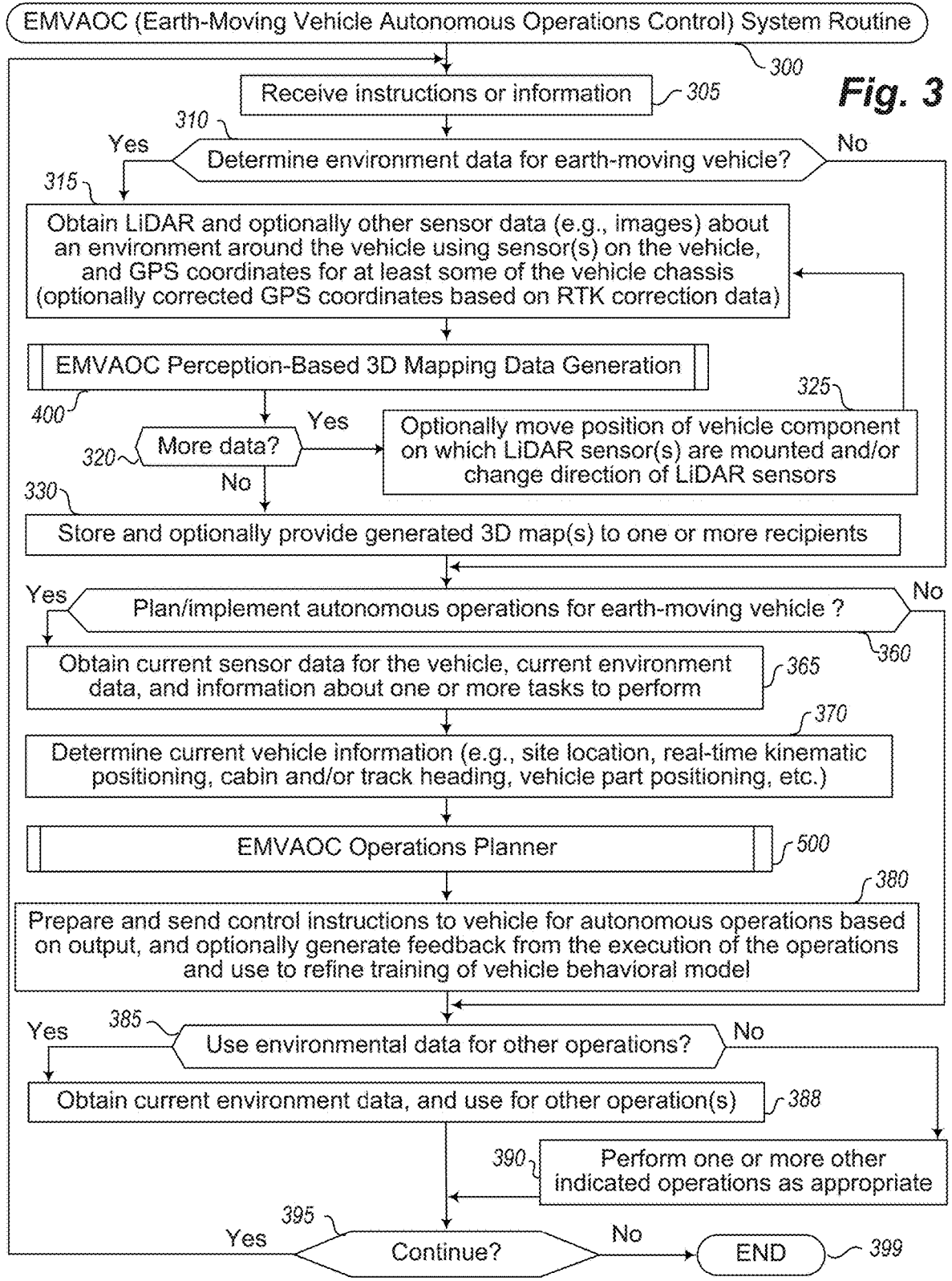
FIG. 3 is an example flow diagram of an illustrated embodiment of an Earth-Moving Vehicle Autonomous Operations Control (EMVAOC) System routine.

FIG. 3 is an example flow diagram of an illustrated embodiment of an EMVAOC (Earth-Moving Vehicle Autonomous Operations Control) System routine 300. The routine may be provided by, for example, execution of an embodiment of the EMVAOC system 140 of FIGS. 1A-1B and/or the EMVAOC system discussed with respect to FIGS. 2A-2O and elsewhere herein, such as to perform automated operations for implementing autonomous control of earth-moving vehicles, including to automatically determine and control movement of an earth-moving vehicle's arm(s) and/or attachment(s) (e.g., digging bucket) to move materials or perform other actions based at least in part on environment data gathered by on-vehicle perception systems, including in some embodiments by an EMVAOC system attached to (e.g., mounted on) and executing on an earth-moving vehicle being controlled (e.g., without interacting with any other computing devices or systems remote from the vehicle, other than to receive incoming transmissions such as GPS signals and RTK correction data). While routine 300 is discussed with respect to controlling operations of a single earth-moving vehicle at a time, it will be appreciated that the routine 300 may be performed in other manners in other embodiments, including to control operations of multiple earth-moving vehicles on a job site, to be implemented by one or more configured devices or systems (optionally in multiple locations and/or operating in a distributed or otherwise coordinated manner, such as with a computing device local to an earth-moving vehicle performing some of the automated operations while one or more remote server systems in communication with that computing device perform additional portions of the routine), etc.

The routine 300 begins in block 305, where instructions or other information is received (e.g., waiting at block 305 until such instructions or other information is received). The routine continues to block 310 to determine whether the instructions or information received in block 305 indicate to determine environment data for an earth-moving vehicle (e.g., using LiDAR and optionally other sensors located on the vehicle) and if so continues to perform blocks 315-330 and 400—in at least some embodiments, sensor data may be gathered repeatedly (e.g., continuously), and if so at least block 315 and optionally 400 may be performed for each loop of the routine and/or repeatedly while the routine is otherwise waiting (e.g., at block 305) to perform other activities. In block 315, the routine obtains LiDAR data and optionally other sensor data (e.g., one or more images) for an environment around the powered earth-moving vehicle using sensors positioned on the vehicle and optionally additional other sensors near the vehicle. The routine then continues to block 400 to invoke a subroutine to perform perception-based 3D mapping data generation, such as by using the sensor data to generate 3D point cloud data and optionally one or more other 3D representations of the environment (e.g., using wire mesh, planar services, voxels, etc.), and using the generated 3D representation(s) to update other existing environment data (if any). In the illustrated embodiment, the subroutine of block 400 may, for example, be performed by perception module 141 of the EMVAOC system, with one example of such a subroutine being further illustrated in FIG. 4, and with output received that includes a generated 3D point cloud data map and/or other 3D mapping representation. As discussed in greater detail elsewhere herein, such sensor data may be gathered repeatedly (e.g., continuously), such as in a passive manner for whatever direction the sensor(s) on the vehicle are currently facing and/or in an active manner by directing the sensors to cover a particular area of the environment that is of interest (including to move vehicle component parts on which the sensors are mounted or otherwise attached to be able to gather additional data, such as data for a new area of the environment that was not previously perceptible and/or updated data for a previous area of the environment that has not been scanned for at least a defined threshold amount of time), and environment information from different scans of the surrounding environment may be aggregated as data from new areas becomes available and/or to update previous data for an area that was previously scanned. After block 400, the routine continues to block 320 to determine whether to gather and analyze additional data (e.g., during an initial scan of an environment, to move the sensors to enable initial data gathering for all or a defined subset of a surrounding environment), and if so continues to block 325 to optionally move a position of one or more vehicle component parts on which the LiDAR component(s) and/or other perception sensor(s) 241 are mounted and/or to move a direction or orientation of the LiDAR component(s) and/or other perception sensor(s) 241, before returning to block 315. If it is instead determined in block 320 to not gather additional data, the routine continues instead to block 330 to store the generated 3D point cloud data map and/or other 3D mapping representation and to optionally provide the generated data to one or more recipients.

After block 330, or if it is instead determined in block 310 that the instructions or information received in block 305 do not indicate to determine environment data for an earth-moving vehicle, the routine 300 continues to block 360 to determine whether the instructions or information received in block 305 indicate to plan and implement autonomous operations of one or more earth-moving vehicles using one or more corresponding trained earth-moving vehicle behavioral models and environment data for the vehicle (e.g., data just determined in blocks 315-330 and 400), such as based on receiving one or more tasks and/or multi-task jobs to be implemented, and if so continues to perform blocks 365-380 and 500 to perform the autonomous operations control. In block 365, the routine obtains current status information for the earth-moving vehicle(s) (e.g., sensor data for the earth-moving vehicle(s)), current environment data for the vehicle(s), and information about the one or more tasks to perform (e.g., as received in block 305). After block 365, the routine continues to block 370, where it determines information about the earth-moving vehicle (e.g., one or more of the earth-moving vehicle's location on the site, real-time kinematic positioning, cabin and/or track heading, positioning of parts of the earth-moving vehicle such as the arm(s)/ bucket, etc.). The routine then continues to block 500 to invoke a subroutine to perform operations planning, such as by planner module 147 of the EMVAOC system, with one example of such a subroutine being further illustrated in FIG. 5, and receives output from it corresponding to operations to be performed by the earth-moving vehicle(s) to perform the one or more tasks. In block 380, the routine then prepares and sends corresponding control instructions to the earth-moving vehicle to initiate autonomous operations for performing the task(s) based on the output, and optionally generates feedback from the execution of the operations for use in subsequent refinement of the earth-moving vehicle behavioral model's training.

If it is instead determined in block 360 that the information or instructions received in block 305 are not to control automated operation of earth-moving vehicle(s), the routine continues instead to block 385 to determine if the information or instructions received in block 305 are to use environment data for other purposes (e.g., for environment data just generated in blocks 315-330 and 400), and if so the routine continues to block 388. In block 388, the routine then obtains current environment data, and uses the environment data to perform one or more additional types of automated operations. Non-exclusive examples of such additional types of automated operations include the following: providing security for the powered earth-moving vehicle and/or for some or all of a job site on which the earth-moving vehicle is located (optionally including one or more other powered earth-moving vehicles), such as if people and/or animals approach the earth-moving vehicle and/or other part of a job site; generating analytics information for some or all of a job site, such as using data only from the earth-moving vehicle or by aggregating information from data from the earth-moving vehicle with data from one or more other earth-moving vehicles (e.g., about locations and/or activities of one or more other vehicles and/or people); performing automated configuration and/or calibration activities for LiDAR and/or image sensors, such as by taking readings and matching them to existing 3D representations of the environment (e.g., terrain maps, photospheres, etc.), including to automatically determine a position on the earth-moving vehicle at which a particular sensor has been mounted or is otherwise located, whether done once or repeatedly; generating further 2D and/or 3D representations, such as a 3D visual map and/or a 2D DigMap representation; etc.

If it is instead determined in block 385 that the information or instructions received in block 305 are not to use environment data for other purposes, the routine continues instead to block 390 to perform one or more other indicated operations as appropriate. For example, the operations performed with respect to block 390 may include receiving and storing data and other information for subsequent use (e.g., actual and/or simulated operational data; sensor data; an overview workplan and/or other goals to be accomplished, such as for the entire project, for a day or other period of time, and optionally including one or more tasks to be performed; etc.), receiving and storing information about earth-moving vehicles on the job site (which vehicles are present and operational, status information for the vehicles, etc.), receiving and responding to requests for information available to the EMVAOC system (e.g., for use in a displayed GUI to an operator user that is assisting in activities at the job site and/or to an end 4user who is monitoring activities), receiving and storing instructions or other information provided by one or more users and optionally initiating corresponding activities, performing generation and/or training (whether initial training and/or retraining/updating) of one or more behavioral models using actual and/or simulated operational data, etc. While not illustrated here, in some embodiments the routine may perform further interactions with a client or other end user, such as before, during or after receiving or providing information in block 390, as discussed in greater detail elsewhere herein. In addition, it will be appreciated that the routine may perform operations in a synchronous and/or asynchronous manner.

After blocks 388 or 390, the routine continues to block 395 to determine whether to continue, such as until an explicit indication to terminate is received, or instead only if an explicit indication to continue is received. If it is determined to continue, the routine returns to block 305 to wait for additional information and/or instructions, and otherwise continues to block 399 and ends.

Figure 4:
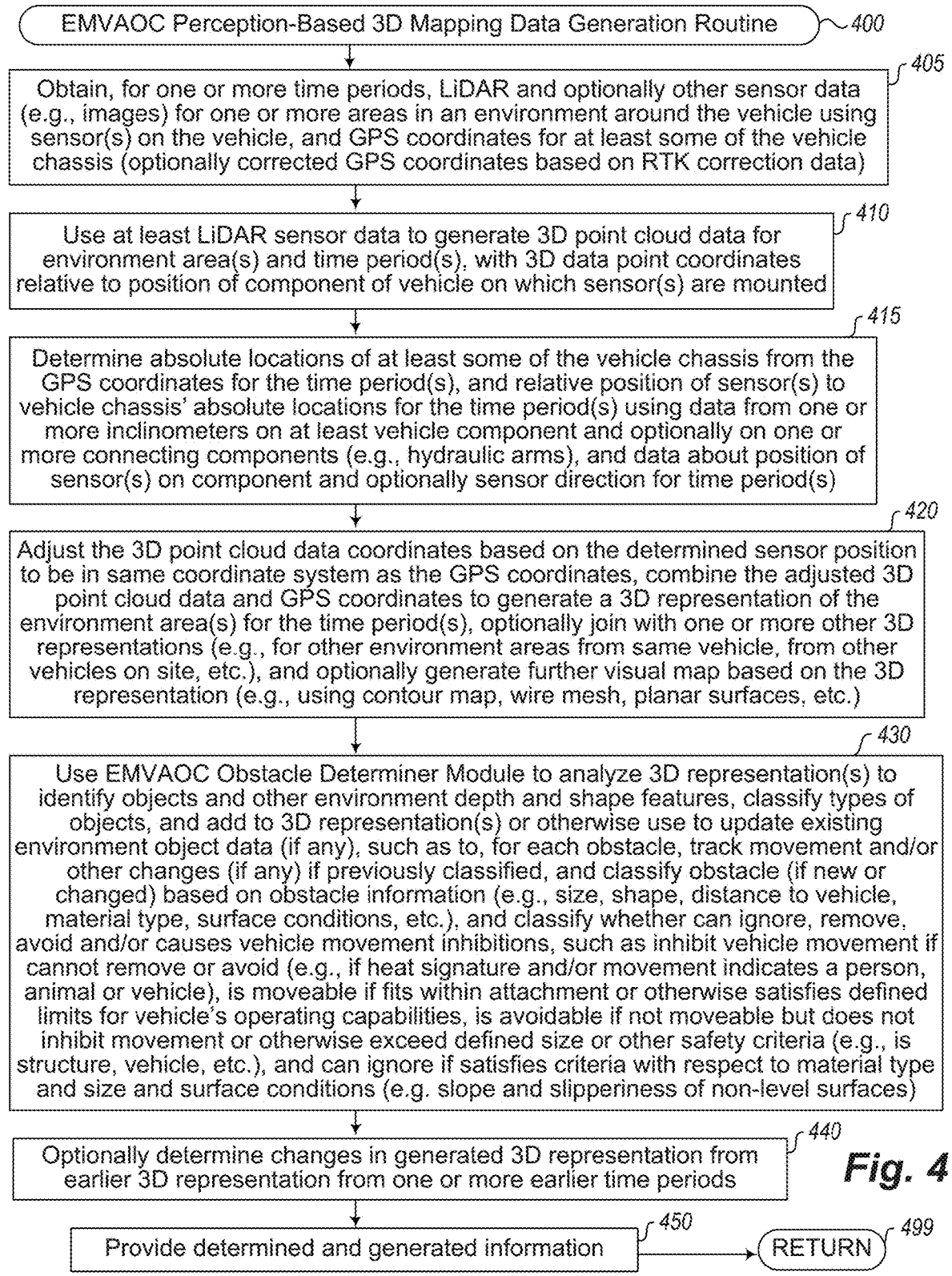
FIG. 4 is an example flow diagram of an illustrated embodiment of an EMVAOC Perception-Based 3D Mapping Data Generation routine.

FIG. 4 is an example flow diagram of an illustrated embodiment of an EMVAOC Perception-Based 3D Mapping Data Generation routine 400. The routine may be performed by, for example, execution of an embodiment of the perception module 141 of FIGS. 1A-1B and/or as discussed with respect to FIGS. 2A-2O and elsewhere herein, such as to perform automated operations for determining data about at least some of an environment surrounding a vehicle based at least in part on gathered LiDAR data from one or more LiDAR components that are mounted on or otherwise attached to the vehicle (e.g., with one or more such LiDAR components mounted on a movable component part of the vehicle, such as the hydraulic arm or tool attachment), and for generating a 3D point cloud representation or other 3D representation for those areas of the surrounding environment. The routine 400 may, for example, be invoked from block 400 of the routine 300 of FIG. 3, and if so, may return to that location upon its end. While the illustrated example of the routine 400 is shown as being performed for one or more time periods before returning, other embodiments the routine 400 may execute repeatedly (e.g., continuously, including during other operations of the vehicle, such as while moving and/or completing tasks) and store or otherwise provide a most current 3D representation for the environment area(s) for use by others (e.g., by a planner module).

The illustrated example of the routine 400 begins at block 405, where, for each of one or more time periods, LiDAR and optionally other sensor data (e.g., images or other visual data) are gathered for one or more areas in an environment around the vehicle using corresponding sensors on the vehicle, and GPS coordinates are further obtained for at least some of the vehicle chassis (e.g., optionally corrected GPS coordinates using RTK correction data)—in other embodiments, GPS coordinates may further be determined for a position at which a LiDAR component is mounted on a vehicle component part, such as by using a GPS receiver positioned at that same location. After block 405, the routine continues to block 410 where, after each of the one or more time periods or instead after all such time periods, the LiDAR sensor data and optionally other sensor data is used to generate 3D point cloud data for the one or more environment areas, with the point cloud data including 3D data points each having coordinates that are specified relative to a position of a location of the LiDAR component. After block 410, the routine continues to block 415 to determine absolute locations of at least some of the vehicle from the GPS coordinates for the time period(s), such as some or all of the vehicle chassis (and optionally the position on the vehicle component part at which the LiDAR component is mounted or otherwise attached).

If GPS data is not used to determine an absolute location of the LiDAR component position, the routine further determines a position of the LiDAR component relative to a point on the vehicle chassis at which the LiDAR component's vehicle component part is connected (or at which an intermediate vehicle component part between the vehicle chassis and that vehicle component part is connected), such as by using readings from one or more inclinometers to determine angular position information indicating a degree of rotation of the one or more vehicle component parts, and by using data about a position at which the LiDAR component is mounted on that vehicle component part, which are then combined with absolute location data for the connection point (e.g., from the GPS data) and used to determine an absolute 3D position in space of the LiDAR component. Similar absolute position data may be determined for locations of other sensors from which environment data is gathered, such as image sensors, and used to adjust relative 3D coordinates of resulting data to be absolute coordinates. After block 415, the routine continues to block 420, where it adjusts the 3D point cloud data coordinates based on the determined sensor positioning so that they are in the same absolute coordinate system as the GPS coordinates, and then uses the adjusted 3D point cloud data to generate a 3D representation of the one or more areas of the environment for the one or more time periods. The routine may further optionally join the generated 3D representation with one or more other 3D representations (e.g., other 3D representations previously generated from the same vehicle, whether for the same and/or different areas of the environment; other 3D representations generated from one or more other vehicles on the site, whether for the same and/or different areas of the environment; etc.), and may further optionally generate a further visual map based on the generated 3D representation (e.g., using a contour map, wire mesh, planar services, etc.) and or a further 2D DigMap representation of the generated 3D representation.

In block 430, the routine then uses the EMVAOC Obstacle Determiner module to analyze the 3D point cloud data of the generated 3D representation to identify objects and other obstacles in the environment area(s) and to determine their locations, to classify types of the obstacles, and to add corresponding information to the generated 3D representation (or to otherwise use the information to update environment object data separately from the 3D representation)—in other embodiments, such an obstacle determiner module may instead be invoked separately from the perception module, such as by the EMVAOC system and/or by the planner module. As part of the analysis in block 430, for obstacles that were previously identified, the routine may track movement and/or changes, and reclassify them if appropriate. As one nonexclusive example, such obstacle classification may include using information about one or more of size, shape, distance to vehicle, material type, surface conditions, etc., including to classify whether the obstacle can be ignored, removed and/or avoided, or instead causes inhibition of vehicle movements (e.g., according to operational constraints of the vehicle and/or defined safety rules). As discussed in greater detail elsewhere herein, such obstacle data may be used in a variety of manners, including by a planner module to determine autonomous operations for the vehicle to perform. In block 440, the routine then optionally determines changes in the generated 3D representation from one or more earlier 3D representations for the same or overlapping areas of the environment (e.g., for use in further planning operations and/or visual maps), and in block 450 provides the determined and generated information for further use before returning in block 499.

FIG. 5 is an example flow diagram of an illustrated embodiment of an EMVAOC Operations Planner routine 500. The routine may be performed by, for example, execution of an embodiment of the planner module 147 of FIGS. 1A-1B and/or as discussed with respect to FIGS. 2A-2O and elsewhere herein, such as to perform automated operations for planning movement or other operations of a vehicle to accomplish one or more tasks. The routine 500 may, for example, be invoked from block 500 of the routine 300 of FIG. 3, and if so, may return to that location upon its end.

The illustrated embodiment of the routine begins at block 505, where information is obtained that includes current environment data for a vehicle (e.g., a 3D representation of one or more areas around the vehicle, locations and classifications of objects and other obstacles, etc.), current vehicle information (e.g., location information on a job site, cabin and/or track heading information, real-time kinematic vehicle component part positioning information, vehicle configurations including tool attachments and other operating capabilities, etc.), and information about one or more tasks to perform (optionally at one or more target destination location separate from the current location of the vehicle). The routine continues to block 550, where it determines and evaluates implementation alternatives for performing the task(s), such as implementation alternatives that include moving vehicle component parts to corresponding positions and at corresponding site locations (optionally along one or more routes or paths between a current location and the one or more target destination locations), and such as to score some or all of the implementation alternatives with respect to one or more evaluation criteria in order to select the best alternative to implement if possible—such evaluation criteria may include one or more factors, such as distance traveled, time spent, fuel used, a safety score with respect to one or more safety-related criteria, etc. In block 550, the routine then determines whether one or more obstacles exist that cause inhibition of vehicle operations for all alternatives, such that none of the implementation alternatives are available to be used, and if so continues to block 560 to determine to initiate inhibition of some or all vehicle operations until conditions change (optionally notifying a human operator and/or another module to attempt corrective activities), and generates corresponding instructions for use as output of the routine. Otherwise, the routine continues to block 565 to generate output for the routine corresponding to the selected implementation alternative, including submitting data to one or more trained vehicle behavioral models to obtain output that includes particular control operations to implement for the vehicle. After blocks 560 or 565, the routine returns in block 599.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures and/or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by

What is claimed is:

1. A powered earth-moving vehicle having an on-board perception system, comprising:
    a chassis, one or more wheels or tracks, a first hydraulic arm that is rotatably coupled to the chassis at a first connection point, and a tool attachment coupled at a second connection point to the first hydraulic arm or to a second hydraulic arm that is coupled to the first hydraulic arm;
    a plurality of GPS antennas mounted at a plurality of locations on the chassis and configured to repeatedly provide GPS coordinates that indicate absolute locations of at least some of the chassis and that are based at least in part on received GPS signals;
    a lidar sensor mounted on a movable component of the powered earth-moving vehicle and being configured to repeatedly generate a plurality of three-dimensional (3D) data points for one or more areas of an environment of a job site surrounding the powered earth-moving vehicle, the component being one of the first hydraulic arm or the second hydraulic arm or the tool attachment, and the 3D data points having coordinates representing relative locations from a position of the lidar sensor; and
    at least one low-voltage microcontroller having one or more hardware processors and one or more memories with software instructions that, when executed by the one or more hardware processors, perform automated operations including at least:
        generating a 3D representation of the one or more areas of the environment by, for each of multiple time periods:
            receiving some of the GPS coordinates that are generated for the time period, and some of the plurality of 3D data points that are generated for the time period for at least one of the one or more areas of the environment;
            generating 3D point cloud data for the at least one area of the environment at the time period that includes the some 3D data points and represents a contour of one or more surfaces in the at least one area;
            determining, based at least in part on one or more readings for the time period of one or more inclinometers, the position of the lidar sensor for the time period, wherein at least one of the inclinometers is mounted on the component, and wherein the one or more readings of the one or more inclinometers provide one or more angular positions relative to the chassis; and
            compiling at least some of the 3D representation that corresponds to the at least the one area, including using the determined position of the lidar sensor for the time period to adjust the coordinates of the some 3D data points in the 3D point cloud data to reflect the absolute locations of the at least some chassis for the time period, and combining the some GPS coordinates for the time period with the some 3D data points for the time period using the adjusted coordinates;
        and wherein the generating of the 3D representation further includes, during one or more of the multiple time periods, moving the component to cause the at least one area for which the some 3D data points are generated for that time period to be different from at least one other prior area before the moving;
        classifying, for each of one or more solid objects identified in the one or more areas from the 3D representation, a type of obstacle of that solid object;
        planning autonomous operations for the powered earth-moving vehicle in the one or more areas of the environment based at least in part on 3D data points in the 3D representation and the classified types of the one or more solid objects; and
        implementing the autonomous operations of the powered earth-moving vehicle without receiving human operator input and without receiving external signals other than the received GPS signals or additional signals for use in correcting the received GPS signals.

2. The powered earth-moving vehicle of claim 1 wherein the automated operations further include at least one of:
    using, by the one or more hardware processors, the 3D representation to initiate one or more security activities for the powered earth-moving vehicle, including detecting at least one of a person or an animal in the one or more areas and performing the initiating of the one or more security activities based at least in part on the detecting; or
    using, by the one or more hardware processors, the 3D representation to initiate one or more security activities for the one or more areas, including detecting at least one of a person or an animal in the one or more areas and performing the initiating of the one or more security activities based at least in part on the detecting; or
    using, by the one or more hardware processors, the 3D representation for the one or more areas to generate and provide analytics information for at least some of the job site, including to detect one or more other vehicles, and to determine information about at least one of location or activity at each of one or more times for the one or more other vehicles; or
    using, by the one or more hardware processors, the 3D representation for the one or more areas to generate and provide analytics information for at least some of the job site, including to detect one or more people, and to determine information about at least one of location or activity at each of one or more times for the one or more people; or
    using, by the one or more hardware processors, the 3D representation for the one or more areas to perform configuration activities for the LiDAR sensor, including to compare the 3D point cloud data to other preexisting information for the one or more areas to determine a position of the LiDAR sensor on the powered earth-moving vehicle; or
    using, by the one or more hardware processors, the 3D representation for the one or more areas to perform calibration activities for the LiDAR sensor, including to compare the 3D point cloud data to other preexisting information for the one or more areas to determine a correction to make to output of the LiDAR sensor to calibrate that output to correspond to the preexisting information for the area.

3. A perception system on a powered earth-moving vehicle, comprising:
- a plurality of GPS antennas mounted at a plurality of locations on a chassis of the powered earth-moving vehicle and configured to provide GPS coordinates that indicate absolute locations of at least some of the chassis and that are based at least in part on received GPS signals;
- a lidar sensor mounted on a component of the powered earth-moving vehicle and configured to generate a plurality of three-dimensional (3D) data points for one or more areas of an environment of a job site surrounding the powered earth-moving vehicle, the component being movable independently of the chassis under powered operations of the powered earth-moving vehicle, and the 3D data points having coordinates representing relative locations from a position of the lidar sensor;
- one or more hardware processors; and
- one or more memories with software instructions that, when executed by the one or more hardware processors, perform automated operations including at least:
  - generating a 3D representation of the one or more areas of the environment by, for each of multiple time periods:
    - receiving GPS coordinates that are generated for the time period, and 3D data points that are generated for the time period for at least one of the one or more areas of the environment;
    - generating 3D point cloud data for the at least one area of the environment at the time period that includes the 3D data points generated for the time period and represents a contour of one or more surfaces in the at least one area;
    - determining, based at least in part on one or more readings for the time period of one or more inclinometers, the position of the lidar sensor for the time period, wherein at least one of the inclinometers is mounted on the component, and wherein the one or more readings of the one or more inclinometers provide one or more angular positions relative to the chassis; and
    - compiling at least some of the 3D representation that corresponds to the at least the one area, including using the determined position of the lidar sensor for the time period to adjust the coordinates of the 3D data points generated for the time period in the 3D point cloud data to reflect the absolute locations of the at least some chassis for the time period, and combining the GPS coordinates generated for the time period with the 3D data points generated for the time period using the adjusted coordinates; and
  - providing the 3D representation to plan autonomous operations for the powered earth-moving vehicle in the environment based at least in part on 3D data points in the 3D representation that identify one or more solid objects in the environment.

4. The perception system of claim 3 further comprising a perception module that includes the software instructions, and one or more other modules to which the 3D representation is provided, wherein the one or more modules include a planner module having further software instructions that, when executed, plan autonomous operations for the powered earth-moving vehicle in the at least one area based at least in part on surfaces in the one or more areas and on the one or more solid objects.

5. The perception system of claim 4 wherein the one or more modules use artificial intelligence techniques and further include an obstacle determiner module having additional software instructions that, when executed, classify a type of obstacle of each of the one or more solid objects, wherein planning of the autonomous operations is based at least in part on the classified type of the obstacle for each of the one or more solid objects, and wherein the autonomous operations for the powered earth-moving vehicle include at least one of moving one or more components of the powered earth-moving vehicle to move at least one solid object, or moving the powered earth-moving vehicle to a different location using a path that avoids the at least one solid object.

6. The perception system of claim 3 wherein, for each of at least some of the multiple time periods after a first of the multiple time periods, the at least one area of the environment for which the 3D data points are generated for that time period is different from a first area of the environment for which the 3D data points are generated for the first time period, and the compiling of the at least some 3D representation for that time period includes updating a partial 3D representation from a previous time period to include visual data for the at least one area of the environment for that time period.

7. The perception system of claim 3 wherein, for each of at least some of the multiple time periods after a first of the multiple time periods, the at least one area of the environment for which the 3D data points are generated for that time period is a same first area of the environment for which the 3D data points are generated for the first time period, and the compiling of the at least some 3D representation for that time period includes updating a 3D representation from a previous time period to reflect changes to the first area from at least one of movement of at least solid object or changes to the contour of the first area caused by autonomous operations of the powered earth-moving vehicle after the first time period.

8. The perception system of claim 3 wherein the automated operations further include generating, based at least in part on the 3D representation, a 3D visual map of at least one of the one or more areas that includes a plurality of cells each including multiple 3D data points and represented in the 3D visual map with at least one value representing those multiple 3D data points, and displaying the generated 3D visual map.

9. The perception system of claim 3 wherein the component of the powered earth-moving vehicle includes a hydraulic arm that is rotatably coupled to the chassis via zero or more other intermediate movable hydraulic arms, and wherein the perception system further comprises the one or more inclinometers, the one or more inclinometers each including at least one of a gyroscope or accelerometer.

10. The perception system of claim 9 wherein the generating of the 3D representation further includes moving the hydraulic arm during one or more of the multiple time periods to cause a second area of the environment that is perceptible by the lidar sensor after the moving to be different from a first area of the environment that is perceptible by the lidar sensor before the moving, wherein the moving includes at least one of vertically rotating the hydraulic arm or horizontally rotating the chassis.

11. The perception system of claim 9 wherein the lidar sensor is configured to scan the environment using a field of view between 40-180 degrees at an orientation that is movable independently of the hydraulic arm, and wherein the generating of the 3D representation further includes moving the orientation of the lidar sensor during one or more of the multiple time periods to cause a second area of the environment that is perceptible by the lidar sensor after the moving to be different from a first area of the environment that is perceptible by the lidar sensor before the moving.

12. The perception system of claim 9 wherein the earth-moving vehicle is at least one of an excavator vehicle, or a bulldozer, or a dump truck, or a loader vehicle, wherein the powered earth-moving vehicle further includes a tool attachment adapted to rotate around a first connection point to the hydraulic arm, and wherein planning of the autonomous operations for the powered earth-moving vehicle includes at least one of rotational movement of the chassis, or rotational movement of the hydraulic arm around a second connection point to the chassis or to another hydraulic arm, or rotational movement of the tool attachment around its first connection point, or movement of tracks and/or wheels of the powered earth-moving vehicle.

13. The perception system of claim 3 further comprising a RGB camera that captures two-dimensional visual data for each of the multiple time periods of at least some of the at least one area of the environment for which the 3D data points are generated for that time period, and wherein the generating of the 3D point cloud data for each of the multiple time periods includes mapping the captured two-dimensional visual data for that time period to the 3D data points generated for that time period that are included in the compiled at least some of the 3D representation for that time period.

14. The perception system of claim 3 further comprising at least one of:
a material analysis sensor that is configured to measure a composition of a load of the powered earth-moving vehicle, and wherein planning of the autonomous operations for the powered earth-moving vehicle is further based in part on the measured composition of the load; or
a pressure sensor that is configured to measure a weight of a load of the powered earth-moving vehicle, and wherein planning of the autonomous operations for the powered earth-moving vehicle is further based in part on the measured weight of the load; or
wherein the perception system further comprises a track alignment sensor that captures a horizontal rotational position of the chassis relative to a track of the powered earth-moving vehicle, and wherein planning of the autonomous operations for the powered earth-moving vehicle is further based in part on the horizontal rotational position of the chassis relative to the track.

15. The perception system of claim 3 further comprising a real-time kinematic (RTK) positioning unit for generating RTK-corrected GPS coordinates for the at least some of the chassis by correcting the provided GPS coordinates based at least in part on received RTK correction signals, and wherein the GPS coordinates generated for each of the multiple time periods are RTK-corrected GPS coordinates.

16. The perception system of claim 15 wherein the one or more hardware processors include at least one low-voltage microcontroller located on the powered earth-moving vehicle, and wherein the automated operations include using artificial intelligence techniques to operate autonomously and implement the planned autonomous operations without receiving human operator input and without receiving external signals other than the received RTK correction signals and the received GPS signals.

17. A method for a perception system on a powered earth-moving vehicle, comprising:
generating, by one or more hardware processors that are on the powered earth-moving vehicle and that are executing software instructions stored in one or more memories on the powered earth-moving vehicle, a 3D representation of one or more areas of an environment of a job site around the powered earth-moving vehicle, wherein the powered earth-moving vehicle includes a plurality of GPS antennas mounted at a plurality of locations on a chassis of the powered earth-moving vehicle and configured to provide information about GPS coordinates that indicate absolute locations of at least some of the chassis based at least in part on received GPS signals, wherein the powered earth-moving vehicle further includes a lidar sensor mounted on a component of the powered earth-moving vehicle and configured to provide information about a plurality of three-dimensional (3D) data points that are for the one or more areas of the environment and that have coordinates representing relative locations from a position of the lidar sensor, wherein the component is movable independently of the chassis under powered operations of the powered earth-moving vehicle, and wherein the generating of the 3D representation includes, for each of multiple time periods:
receiving GPS coordinates that are generated for the time period, and 3D data points that are generated for the time period for at least one of the one or more areas of the environment;
generating 3D point cloud data for the at least one area of the environment at the time period that includes the 3D data points generated for the time period and represents a contour of one or more surfaces in the at least one area;
determining, based at least in part on one or more readings for the time period of one or more inclinometers, the position of the lidar sensor for the time period, wherein at least one of the inclinometers is mounted on the component, and wherein the one or more readings of the one or more inclinometers provide one or more angular positions relative to the chassis; and
compiling at least some of the 3D representation that corresponds to the at least the one area, including using the determined position of the lidar sensor for the time period to adjust the coordinates of the 3D data points generated for the time period in the 3D point cloud data to reflect the absolute locations of the at least some chassis for the time period, and combining the GPS coordinates generated for the time period with the 3D data points generated for the time period using the adjusted coordinates; and
providing, by the one or more hardware processors, the 3D representation for use in planning autonomous operations for the powered earth-moving vehicle in the environment based at least in part on 3D data points in the 3D representation that identify one or more solid objects in the environment.

18. The method of claim 17 further comprising:
classifying, by the one or more hardware processors, a type of obstacle of each of the one or more solid objects; and
planning, by the one or more hardware processors and based at least in part on the classified type of the obstacle for each of the one or more solid objects, the autonomous operations for the powered earth-moving vehicle in the at least one area based at least in part on surfaces in the one or more areas and on the one or more solid objects, wherein the autonomous operations include moving at least one of one or more components of the powered earth-moving vehicle to move at least one solid object, or the powered earth-moving vehicle to a different location using a path that avoids the at least one solid object.

19. The method of claim 17 wherein, for each of at least some of the multiple time periods after a first of the multiple time periods, the at least one area of the environment for which the 3D data points are generated for that time period is different from a first area of the environment for which the 3D data points are generated for the first time period, and the compiling of the at least some 3D representation for that time period includes updating a partial 3D representation from a previous time period to include visual data for the at least one area of the environment for that time period.

20. The method of claim 17 wherein, for each of at least some of the multiple time periods after a first of the multiple time periods, the at least one area of the environment for which the 3D data points are generated for that time period is a same first area of the environment for which the 3D data points are generated for the first time period, and the compiling of the at least some 3D representation for that time period includes updating a 3D representation from a previous time period to reflect changes to the first area from at least one of movement of at least one solid object or changes to a contour of the first area caused by autonomous operations of the powered earth-moving vehicle after the first time period.

21. The method of claim 17 wherein the automated operations further include generating, by the one or more hardware processors and based at least in part on the 3D representation, a 3D visual map of at least one of the one or more areas that includes a plurality of cells each including multiple 3D data points and represented in the 3D visual map with at least one value representing those multiple 3D data points, and displaying, by the one or more hardware processors, the generated 3D visual map.

22. The method of claim 17 wherein the component of the powered earth-moving vehicle includes a hydraulic arm that is rotatably coupled to the chassis via zero or more other intermediate movable hydraulic arms, wherein the one or more inclinometers each includes at least one of a gyroscope or accelerometer, wherein the generating of the 3D representation further includes moving the hydraulic arm during one or more of the multiple time periods to cause a second area of the environment that is perceptible by the lidar sensor after the moving to be different from a first area of the environment that is perceptible by the lidar sensor before the moving, and wherein the moving includes at least one of vertically rotating the hydraulic arm or horizontally rotating the chassis.

23. The method of claim 22 wherein the powered earth-moving vehicle further includes a tool attachment adapted to rotate around a first connection point to the hydraulic arm and is at least one of an excavator vehicle, or a bulldozer, or a dump truck, or a loader vehicle, and wherein the planning of the autonomous operations for the powered earth-moving vehicle includes at least one of rotational movement of the chassis, or rotational movement of the hydraulic arm around a second connection point to the chassis or to another hydraulic arm, or rotational movement of the tool attachment around its first connection point, or movement of tracks and/or wheels of the powered earth-moving vehicle.

24. The method of claim 17 wherein the powered earth-moving vehicle further includes at least one of:
a RGB camera that captures two-dimensional visual data for each of the multiple time periods of at least some of the at least one area of the environment for which the 3D data points are generated for that time period, and wherein the generating of the 3D point cloud data for each of the multiple time periods includes mapping the captured two-dimensional visual data for that time period to the 3D data points generated for that time period that are included in the compiled at least some of the 3D representation for that time period; or
a material analysis sensor that measures a composition of a load of the powered earth-moving vehicle, and wherein the planning of the autonomous operations for the powered earth-moving vehicle is further based in part on the measured composition of the load; or
a pressure sensor that measures a weight of a load of the powered earth-moving vehicle, and wherein the planning of the autonomous operations for the powered earth-moving vehicle is further based in part on the measured weight of the load; or
a track alignment sensor that captures a horizontal rotational position of the chassis relative to a track of the powered earth-moving vehicle, and wherein the planning of the autonomous operations for the powered earth-moving vehicle is further based in part on the horizontal rotational position of the chassis relative to the track; or
a real-time kinematic (RTK) positioning unit for generating RTK-corrected GPS coordinates for the at least some of the chassis by correcting the provided GPS coordinates based at least in part on received RTK correction signals, and wherein the GPS coordinates generated for each of the multiple time periods are RTK-corrected GPS coordinates.

25. The method of claim 17 wherein the one or more hardware processors include at least one low-voltage microcontroller located on the powered earth-moving vehicle, and wherein the generating of the 3D representation is performed autonomously without receiving human operator input and without receiving external signals other than received signals that are used to determine the absolute locations of the at least some of the chassis and that include the received GPS signals.

* * * * *

UNITED STATES PATENT AND TRADEMARK OFFICE
CERTIFICATE OF CORRECTION

PATENT NO. : 11,746,501 B1  
APPLICATION NO. : 18/100492  
DATED : September 5, 2023  
INVENTOR(S) : Andrija Gajić et al.

Page 1 of 1

It is certified that error appears in the above-identified patent and that said Letters Patent is hereby corrected as shown below:

On the Title Page

Assignee (item (73)), Line 11:
"RIM Intelligent Machines, Inc.," should read --AIM Intelligent Machines, Inc.,--.

Signed and Sealed this  
Third Day of October, 2023

Katherine Kelly Vidal  
*Director of the United States Patent and Trademark Office*